US010798460B2

(12) United States Patent
Chong et al.

(10) Patent No.: US 10,798,460 B2
(45) Date of Patent: Oct. 6, 2020

(54) DEVICE AND METHOD FOR CROWD-SOURCING MOVIE SCREENINGS

(71) Applicant: GOGOCINEMA INTERNATIONAL FZ-LLC, Dubai (AE)

(72) Inventors: Man Nang Chong, North Point (HK); Pranay Kumar, North Point (HK)

(73) Assignee: GOGOCINEMA INTERNATIONAL FZ-LLC, Dubai (AE)

( * ) Notice: Subject to any disclaimer, the term of this patent is extended or adjusted under 35 U.S.C. 154(b) by 74 days.

(21) Appl. No.: 15/953,383

(22) Filed: Apr. 13, 2018

(65) Prior Publication Data

US 2019/0320234 A1     Oct. 17, 2019

(51) Int. Cl.
*G06Q 10/02* (2012.01)
*H04N 21/482* (2011.01)
(Continued)

(52) U.S. Cl.
CPC .......... *H04N 21/482* (2013.01); *G06Q 10/02* (2013.01); *G06Q 10/025* (2013.01);
(Continued)

(58) Field of Classification Search
CPC ............. H04N 21/482; H04N 21/458; H04N 21/4524; H04N 21/4755; H04N 21/262;
(Continued)

(56) References Cited

U.S. PATENT DOCUMENTS 8,984,015 B1 * 3/2015 Toader ................... G06Q 30/00
707/792

2003/0187802 A1 * 10/2003 Booth ..................... G06Q 10/02
705/59

(Continued)

FOREIGN PATENT DOCUMENTS

CN       1335723 A      2/2002
CN     106412641 A      2/2017
(Continued)

OTHER PUBLICATIONS

Written Opinion and International Search Report dated Nov. 19, 2019, for PCT Application No. PCT/IB2019/053054, filed Apr. 13, 2019, seven pages.

*Primary Examiner* — Nasser M Goodarzi
*Assistant Examiner* — Patrick A Ryan
(74) *Attorney, Agent, or Firm* — Morrison & Foerster LLP

(57) ABSTRACT

A method for crowd-souring a screening by a user of an electronic device is disclosed. The method includes displaying, at a display of the electronic device, a plurality of available content selections received from a first server, and receiving, at the electronic device, a content selection of the plurality of available content selections. The method further includes displaying, at the display, a plurality of available cinema theater selections received from a second server in response to receiving the content selection, and receiving, at the electronic device, a cinema theater selection of the plurality of available cinema theater selections. The method also includes displaying, at the display, a plurality of available date and time selections received from the second server in response to receiving the cinema theater selection, and receiving, at the first electronic device, a date and time selection of the plurality of available date and time selections.

17 Claims, 21 Drawing Sheets

(51) Int. Cl.
*H04N 21/262* (2011.01)
*H04N 21/45* (2011.01)
*H04N 21/458* (2011.01)
*H04N 21/475* (2011.01)
*G06Q 10/06* (2012.01)
*G06Q 10/10* (2012.01)

(52) U.S. Cl.
CPC ... *G06Q 10/063116* (2013.01); *G06Q 10/101* (2013.01); *H04N 21/262* (2013.01); *H04N 21/458* (2013.01); *H04N 21/4524* (2013.01); *H04N 21/4755* (2013.01)

(58) Field of Classification Search
CPC ............. G06Q 10/02; G06Q 10/025; G06Q 10/063116; G06Q 10/101
See application file for complete search history.

(56) References Cited

U.S. PATENT DOCUMENTS

| | | | |
|---|---|---|---|
| 2004/0059643 | A1* | 3/2004 | Marti ............... G06Q 30/02 705/26.1 |
| 2007/0186253 | A2 | 8/2007 | Hunter |
| 2010/0058379 | A1* | 3/2010 | Lin ............... H04N 7/17318 725/24 |
| 2014/0019173 | A1* | 1/2014 | Spindler ............ G06Q 10/02 705/5 |
| 2018/0137205 | A1* | 5/2018 | Jaeger ............. G06Q 10/101 |
| 2020/0154168 | A1 | 5/2020 | Chong |

FOREIGN PATENT DOCUMENTS

| | | |
|---|---|---|
| CN | 109068168 A | 12/2018 |
| CN | 109523322 A | 3/2019 |
| WO | WO2019198057 A2 | 10/2019 |

* cited by examiner

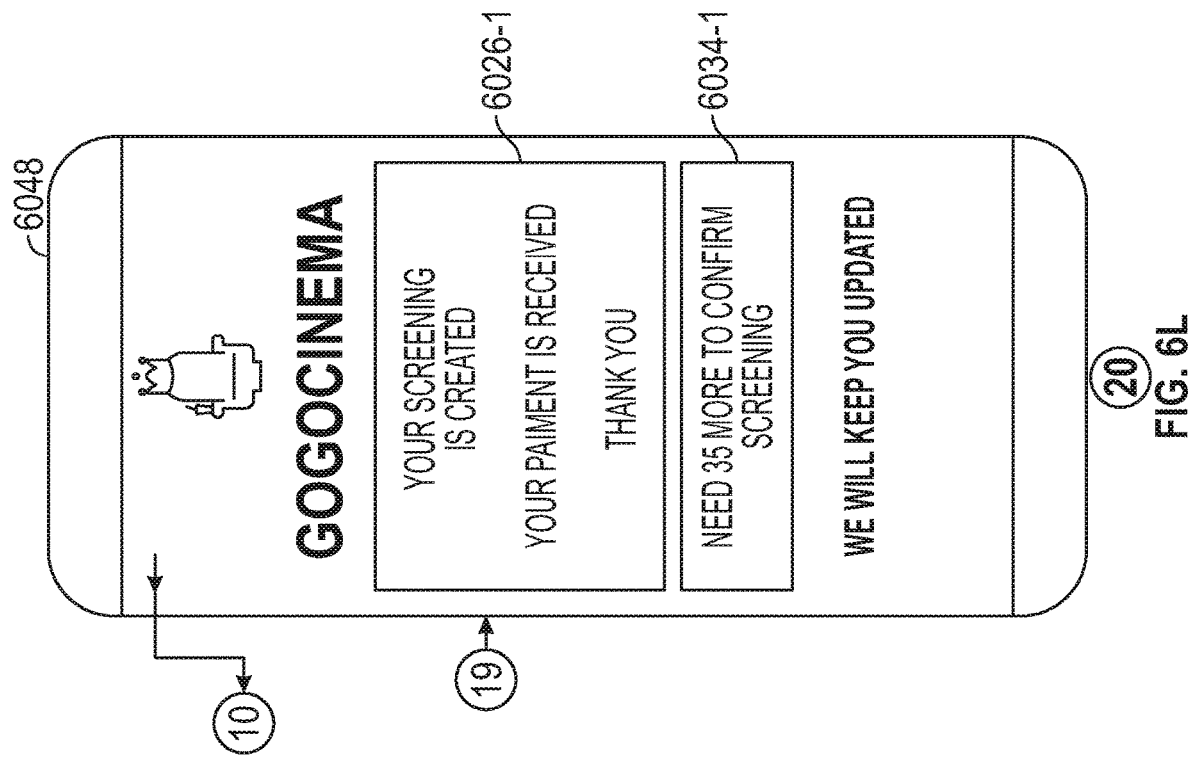

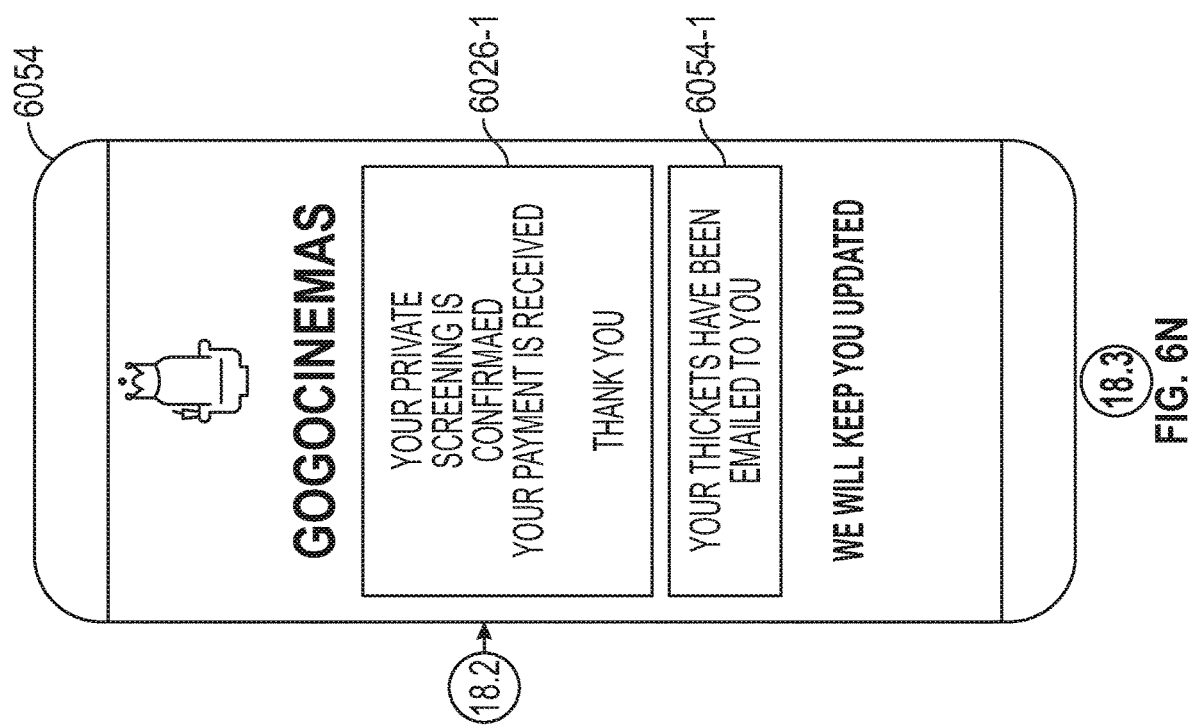

DEVICE AND METHOD FOR CROWD-SOURCING MOVIE SCREENINGS

FIELD OF THE DISCLOSURE

This relates generally to crowd-sourcing movie screenings at cinema theaters.

BACKGROUND OF THE DISCLOSURE

Today consumers can consume content in a variety of ways. For example, users can watch movies from the comfort of their homes on televisions, tablets, smartphones, and other handheld devices. Moreover, users can select what movies to watch on an on-demand basis to best fit their schedules. This results in cinema theaters routinely going underutilized with the average cinema attendance rate being approximately 15-20%. Moreover, unlike typical on-demand content, movies have short exhibition periods (e.g., wide-release movies are usually out only about four weeks on average) and cinema theaters have limited screening times. Therefore, a solution to empower consumers to schedule movie screenings on an on-demand basis at cinema theaters can be desirable.

SUMMARY OF THE DISCLOSURE

Examples of the disclosure are directed to crowd-sourcing movie screenings at cinema theaters to increase utilization rates of cinema theaters and movies. A system in accordance with a preferred embodiment of the present invention allows a first user to create a screening by enabling the user to select a movie from a plurality of available movies, to select a cinema theater, and to select a date and time to screen the selected movie at the selected cinema theater. The system then allows other users to join the screening scheduled by the first user. Once a minimum number of users join the screening, the system confirms the screening and the users can then enjoy the movie selected by the first user at the cinema theater selected by the first user and at the date and time selected by the first user. In accordance with one embodiment, the system will cancel the movie screening if a minimum number of users fail to join the screening. In some examples, the first user can select multiple movies to screen sequentially. For example, the user can select to screen all previously released Marvel Avengers movies and the recently released Marvel Avengers movie in any desired order (e.g., in the order in which they were released, in chronological order, or any other desired order). In accordance with one embodiment, the first user can set the screening as a public screening (e.g., where any user can join the screening) or as a private screening (e.g., where users can only join by invitation). In some embodiments, the first user can select other types of content for screening. For example, the first user can select live events (e.g., sporting events, awards shows, political speeches), television programs (e.g., one or more episodes of a content series, an entire season of a content series), pay-per-view events (e.g., a boxing event, a mixed martial arts event, a wrestling event) or any other content that a user would otherwise be able to consume at home or a cinema theater. In accordance with one embodiment, when a screening is cancelled (e.g., either because a minimum number of users failed to join the screening or expressly by a system administrator, cinema theater representative, or the first user that created the screening), the system will keep track of the user that scheduled it and any users that joined the screening and notify those users when another user creates a screening of the same or similar content. In this way, the system can match users with similar interests together to increase the chances of having the screening confirmed.

DETAILED DESCRIPTION

In the following description of examples, references are made to the accompanying drawings that form a part hereof, and in which it is shown by way of illustration specific examples that can be practiced. It is to be understood that other examples can be used and structural changes can be made without departing from the scope of the disclosed examples.

Examples of the disclosure are directed to crowd-sourcing movie screenings at cinema theaters to increase utilization rates of cinema theaters and movies. A system in accordance with a preferred embodiment of the present invention allows a first user to create a screening by enabling the user to select a movie from a plurality of available movies, to select a cinema theater, and to select a date and time to screen the selected movie at the selected cinema theater. The system then allows other users to join the screening scheduled by the first user. Once a minimum number of users join the screening, the system confirms the screening and the users can then enjoy the movie selected by the first user at the cinema theater selected by the first user and at the date and time selected by the first user. In accordance with one embodiment, the system will cancel the movie screening if a minimum number of users fail to join the screening. In some examples, the first user can select multiple movies to screen sequentially. For example, the user can select to screen all previously released Marvel Avengers movies and the recently released Marvel Avengers movie in any desired order (e.g., in the order in which they were released, in chronological order, or any other desired order). In accordance with one embodiment, the first user can set the screening as a public screening (e.g., where any user can join the screening) or as a private screening (e.g., where users can only join by invitation). In some embodiments, the first user can select other types of content for screening. For example, the first user can select live events (e.g., sporting events, awards shows, political speeches), television programs (e.g., one or more episodes of a content series, an entire season of a content series), pay-per-view events (e.g., a boxing event, a mixed martial arts event, a wrestling event) or any other content that a user would otherwise be able to consume at home or a cinema theater. In accordance with one embodiment, when a screening is cancelled (e.g., either because a minimum number of users failed to join the screening or expressly by a system administrator, cinema theater representative, or the first user that created the screening), the system will keep track of the user that scheduled it and any users that joined the screening and notify those users when another user creates a screening of the same or similar content. In this way, the system can match users with similar interests together to increase the chances of having the screening confirmed.

Figure 1:
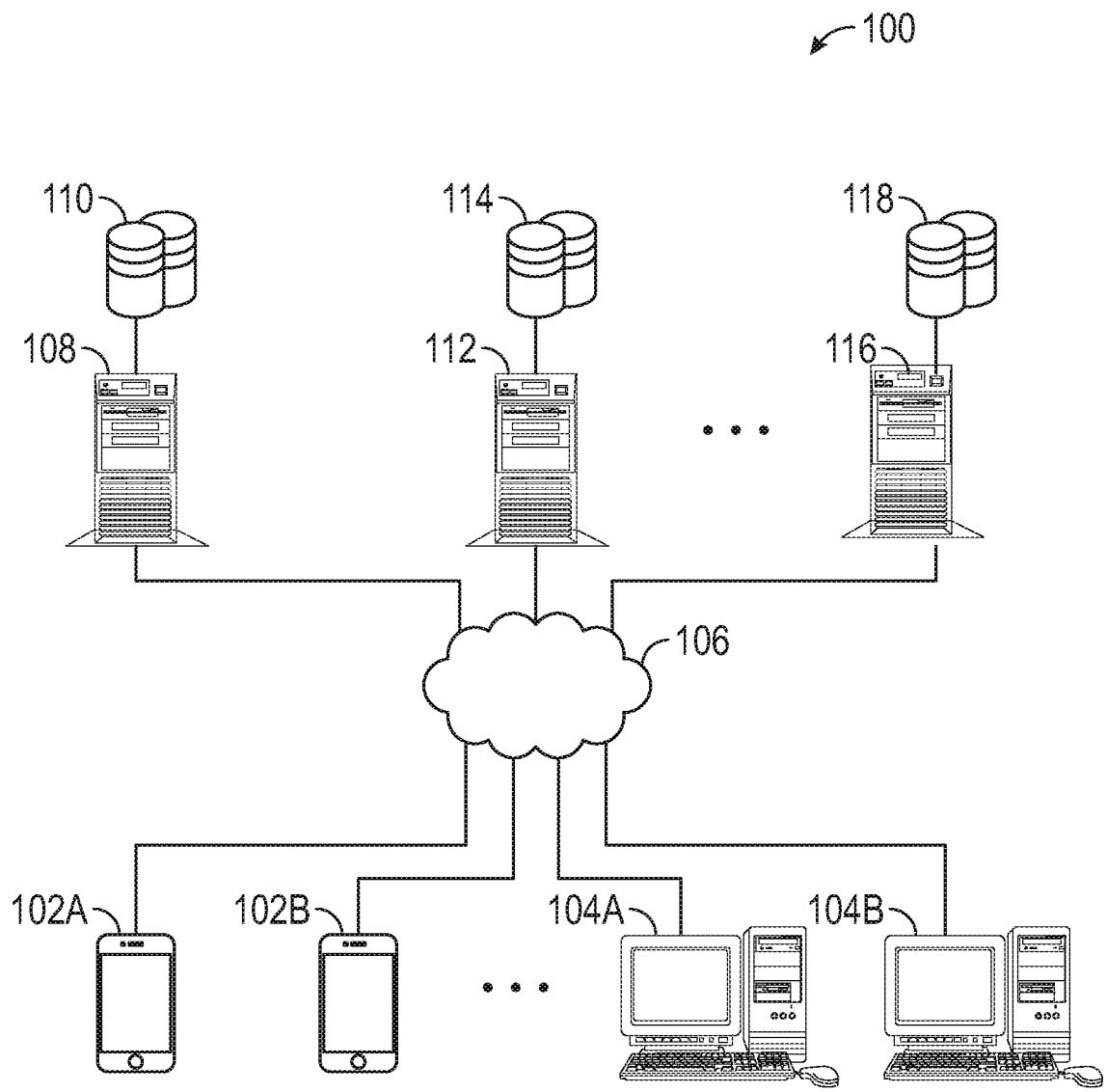
FIG. 1 illustrates a network including various devices according to examples of the disclosure.

FIG. 1 illustrates a network 100 including various devices according to examples of the disclosure. As illustrated, the devices can include, for example, server 108 which can host a software application and/or a mobile app for crowd-sourcing movie screenings (e.g., can perform server-end functions of the software application and/or mobile app) and/or host a website for providing similar functionality as the software application or mobile app, server 112 which can host information about a variety of cinema theaters (e.g., at databases 114), server 116 which can host a variety of content (including content information) for screening at a cinema theater (e.g., at databases 118), and devices 102A and 102B (e.g., smartphones, tablets, and/or any other handheld devices) and computers 104A and 104B (e.g., laptops, desktop computers) for running the software application and/or mobile app supported by server 108 and/or for interacting with the website hosted on sever 108. Servers 108, 112, and 116; devices 102A and 102B; and computers 104A and 104B can be connected to each other via network 106. In one embodiment, sever 108 can make the software and/or mobile app for crowd-sourcing movie screening available for download (e.g., at databases 110). In another embodiment, the software and/or mobile app for crowd-sourcing movie screenings can be made available for download by a software depository (e.g., an app store) (not shown).

Although only three servers, three databases, two devices, and two computers are shown in FIG. 1, it should be understood that additional servers, databases, devices and/or computers can be connected to the same network 106. For example, server 108 can represent two or more servers (e.g., a server to host server-end functionality of a software application, a server to host server-end functionality of a mobile app, a server for hosting the mobile app for download, a server for hosting a website for providing similar functionality as the software application or mobile app).

In one embodiment, servers 108, 112, and 116 can be the same server that can host the software application, mobile app, website, cinema theater information, and/or content (including content information). In other embodiments, servers 108, 112, and 116 can be separate devices controlled by the same or different entities. For example, server 112 can be controlled by a cinema theater or cinema theater chain and server 116 can be controlled by a content owner. Additionally or optionally, server 108 can also perform user authentication, payment verification, and/or other processes that may be a part of any processes described below. Server 108 can provide logic and/or content to run a particular software application or mobile app (e.g., a movie screening crowd-sourcing app) on devices 102A, 102B, 104A, and/or 104B (and/or other devices on the same network). In one embodiment, devices 102A, 102B, 104A, and/or 104B can access a web site hosted on server 108 via the network 106 (e.g., the Internet). The network can be a secured or unsecured network.

Figure 2:
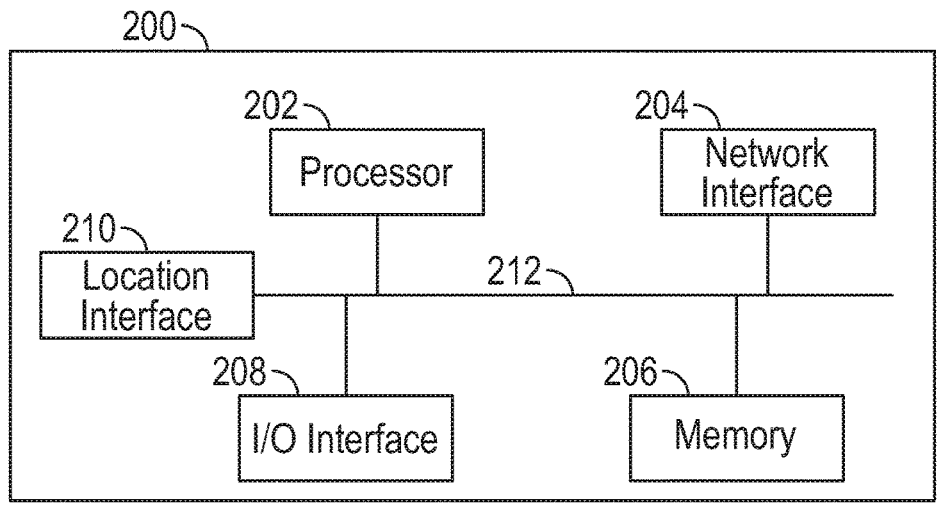
FIG. 2 illustrates a block diagram of a multifunction device according to examples of the disclosure.

FIG. 2 illustrates a block diagram of a multifunction device 200 according to examples of the disclosure. As illustrated, device 200 can include processor 202 (e.g., a central processing unit (CPU)), network interface 204, memory 206, input/output (I/O) interface 208, and location interface 210, all of which can be connected to each other via a system bus 212. Processor 202 can perform any of the methods described with references to FIGS. 1 and 3-6. Additionally, network interface 204 can perform any of the communications (e.g., internet communications, email, text, phone calls) described with reference to FIGS. 1 and 3-6. Moreover, memory 206 can store data and instructions for performing any or all of the methods described with references to FIGS. 2-6. Memory 206 and/or memory 116 can be any non-transitory computer-readable storage medium, such as a solid-state drive or a hard disk drive, among other possibilities. Further, I/O interface can interact with any I/O components contained within and/or attached to device 200, including, but not limited to, one or more of display, keyboard, keypad, touch screen, speaker, and microphone. Lastly, location interface 210 can determine the location of device 200 by interacting with typical software and/or hardware systems or components for determining the device's location. For example, location interface 210 can interact with a GPS receiver (not shown) contained within or attached to device 200 to determine the device's location. In another example, location interface 210 can interact with known software and hardware components (not shown) that can determine the device's location through multilateration techniques (e.g., trilateration) using cell phone towers, network routers, and/or any fixed network devices that can be used to locate a device.

Figure 3:
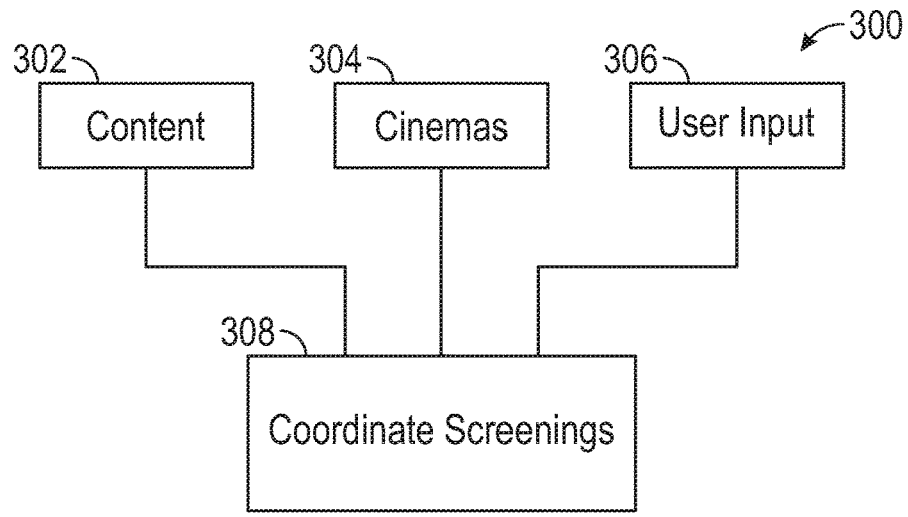
FIG. 3 illustrates a process for crowd-sourcing screenings according to examples of the disclosure.

FIG. 3 illustrates process 300 for crowd-sourcing screenings according to examples of the disclosure. In some examples, steps 302 and 304 can be performed serially (e.g., step 302 first and step 304 second or vice versa). In some examples, steps 302 and 304 can be performed concurrently. In some examples, step 302 can be performed at server 118 of FIG. 118, step 304 can be performed at server 114 of FIG. 1, step 306 can be performed on devices 102A/102B and/or computers 104A/104B, and step 308 can be performed at server 108 of FIG. 1. In some examples, either or both steps 302 and 304 can be performed at server 108 of FIG. 1.

At step 302, content and/or content information is obtained. For example, content and/or content information can be obtained directly from a content owner and/or from a central repository. The content can be obtained in the Digital Cinema Package (DCP) format. The content information can include, but is not limited to, title, duration, description, release date, credits (including cast information), ratings (e.g., G, PG, PG-13, R), reviews (e.g., Rotten Tomatoes review (including Tomatometer score), IMDb rating, images (including movie art or movie posters), and/or genre information. In some examples, the content and/or content information can be stored locally at a cinema theater or on a remote server or servers.

At step 304, cinema theater information in obtained. Cinema information can include, but is not limited to, address, hours of operation, dates of operation, available screening times, available screening dates, seating charts, images (including of the exterior and interior), reviews (e.g., Yelp review, Google review), and/or a minimum audience required to confirm a screening (e.g., as described below with reference to FIG. 5).

At step 306, user input is obtained. In the preferred embodiment of the present invention, a user can select content (e.g., one or more of a movie, sporting event, episode of a content series) for a screening (e.g., as described with reference to FIG. 4 below). The user can also select a cinema theater and a date and time for the screening at step 306 (e.g., as described with reference to FIG. 4 below). In the preferred embodiment, other users can join screenings at step 306. In one embodiment, a user can download a mobile app for crowd-sourcing a movie screening in accordance with the examples of the disclosure at step 306. In the preferred embodiment, a user can create a user profile, including setting user preferences, (e.g., as described in more detail below) for crowd-sourcing movie screenings. A user can enter authentication information at step 306 of process 300. In some embodiments, the authentication information can be the authentication information for other systems (e.g., Facebook, Google). In the preferred embodiment, the user can enter payment information at step 306 of process 300. A user can also select a screening to join at step 306 of process 300 (e.g., as described with reference to FIG. 4 below).

At step 308, screenings are crowd-sourced according to examples of the disclosure. In the preferred embodiment, a screening will be confirmed, expired, or cancelled at step 308 based on the information received at steps 302, 304, and/or 306 (e.g., as described with reference to FIG. 5 below). For example, process 300 will keep track of how many users join a screening at step 308. If sufficient users join a screening, process 300 will confirm the screening at step 308 and reserve the cinema theater for the date and time selected by a user at step 306 (e.g., as described below with reference to FIG. 5 below). In some embodiments, this confirmation can be done automatically once a minimum number of users join a screening (e.g., without further action from the cinema theater or any other entity). In other embodiments, process 300 will send a request to the cinema theater for confirmation at step 308. In such a case, a cinema theater will confirm or cancel (e.g., reject) the screening. If the screening is confirmed, process 300 will notify the users that joined the screening (including the user that created the screening) at step 306 that the screening is confirmed (e.g., via email, text, and/or automated phone call) at step 308. In one embodiment, process 300 will email the users that joined the screening (including the user that created the screening) at step 306 tickets for admission to the screening at step 308. In one embodiment, process 300 will email users tickets for admission to the screening at the time the screening is created and at the time any other user joins the screening. In one embodiment, tickets are stored and managed within the mobile app and are only accessible through the mobile app once the screening is confirmed.

If insufficient users join a screening or the screening is cancelled (e.g., as described with reference to FIG. 5 below), process 300 will notify the user that created the screening and any other users that joined the screening that the screening expired and/or was not confirmed (e.g., via email, text, and/or automated phone call) at step 308. In some embodiments, process 300 can also notify the selected cinema theater of the expired or cancelled screening at step 308. In this way, the cinema theater will be able to schedule another screening at the selected date and time. In some examples, process 300 will keep track of all users that joined an expired or cancelled screening (including the user that created the screening) and, optionally, notify them if a similar screening is scheduled at a future date (e.g., the same or similar movie is scheduled for a screening at the same or a different cinema theater). In some examples, process 300 will also notify users that joined a screening that was confirmed or expired when a new screening of similar content (e.g., a movie sequel, a movie prequel, another movie with the same lead actor) is created.

In some examples, steps 302 and/or 304 of process 300 are performed in response to user input received at step 306. For example, user input requesting available content may be received at step 306. In response to receiving the request for available content, process 300 may request a plurality of available content (e.g., as described below with reference to FIG. 4) at step 302. In response to receiving a selection of a first content from the plurality of content at step 306, process 300 may request a plurality of available cinema theaters for the screening of the selected content (e.g., as described below with reference to FIG. 4) at step 304. In response to receiving a selection of a first cinema theater from the plurality of available cinema theaters at step 306, process 300 may request a plurality of available dates and times for the screening (e.g., as described below with reference to FIG. 4) at step 304.

Figure 4:
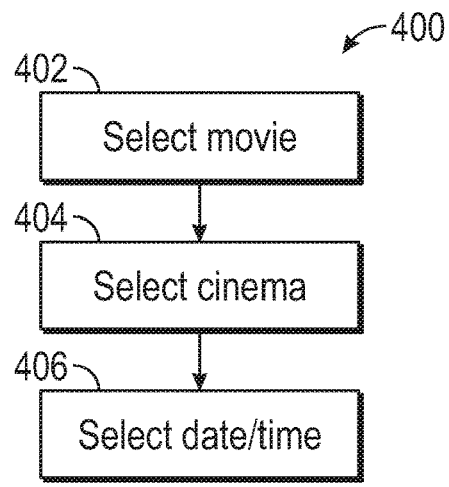
FIG. 4 illustrates a process for creating a screening according to examples of the disclosure.

FIG. 4 illustrates a process 400 for creating a screening according to examples of the disclosure. In some examples, process 400 can be used as a subroutine at step 308 of process 300. For example, process 400 can be invoked by process 300 at step 308 when a user wants to create a new screening (e.g., when user input is received at step 306 of process 300). It should be understood at process 400 can be implemented in a mobile app, a website, or any other computer program that can be run on a device and/or computer.

At step 402, a movie from a plurality of available movies is selected. In some embodiments, the plurality of available movies can include all of the movies available for screening at cinema theaters within a threshold distance from the location of the device or computer running process 400. In some embodiments, the plurality of available movies can include all of the movies available for screening at cinema theaters within a threshold distance from a location entered by a user. In some examples, the threshold distance is a default distance (e.g., 25 miles). In other examples, the threshold distance is any distance defined by a user. In some embodiments, other forms of content can be selected at step 402 (e.g., live events, television programs, pay-per-view events, any other content that a user would otherwise be able to consume at home or a cinema theater). In response to a movie selection at step 402, process 400 continues to step 404.

At step 404, a cinema theater from a plurality of cinema theaters is selected. In some embodiments, the plurality of cinema theaters can include all of the cinema theaters with access to the selected content at step 402 and within a threshold distance from the location of the device or computer running process 400. In some embodiments, the plurality of cinema theaters can include all of the cinema theaters with access to the selected content at step 402 and within a threshold distance from a location entered by a user. In some examples, the threshold distance is a default distance (e.g., 25 miles). In other examples, the threshold distance is defined by a user. In some examples, the plurality of cinema theaters can include all of the cinema theaters that have access to the movie selected at step 402. In response to a cinema theater selection at step 404, process 400 continues to step 406.

At step 406, a date and time for the screening is selected from a plurality of available dates and times at the cinema theater selected at step 404. In some embodiments, the plurality of available dates and times can include all of the available dates and times beyond a threshold date. In some examples, the threshold date can be a default date (e.g., two weeks, a month, two months from the current date). In other examples, the threshold date can be defined by the cinema theater selected at step 404. For example, a cinema theater may define the threshold date as a date three months from the current date.

In some examples, once a screening is created (e.g., once a movie, cinema theater, and date and time are selected), another user cannot create another screening at the same theater and at the same date and time unless the screening is cancelled (e.g., by the user that created it, by a system administrator, and/or by a representative of the cinema theater). In other examples, users can create screenings at the same or overlapping dates and times. In such an example, the cinema theater is not reserved until a screening is confirmed. At which point, any conflicting unconfirmed screenings will be cancelled.

In some examples, once a screening is created (e.g., once a movie, cinema theater, and date and time are selected), process 400 can, at step 406, optionally notify other users with a screening history of the same or similar selected movie of the newly created screening to allow them to join the screening.

In some examples, process 400 can allow the user to purchase one or more tickets for admission to the screening at step 406. In the preferred embodiment, process 400 will not create the screening until the user purchases one or more tickets to the screening.

In some examples, process 400 can allow the user to designate the screening as a public or private screening at step 406. For example, a public screening would allow any user to join. Conversely, a private screening would allow other users to join only by invitation (e.g., from the user that created the screening).

Figure 5:
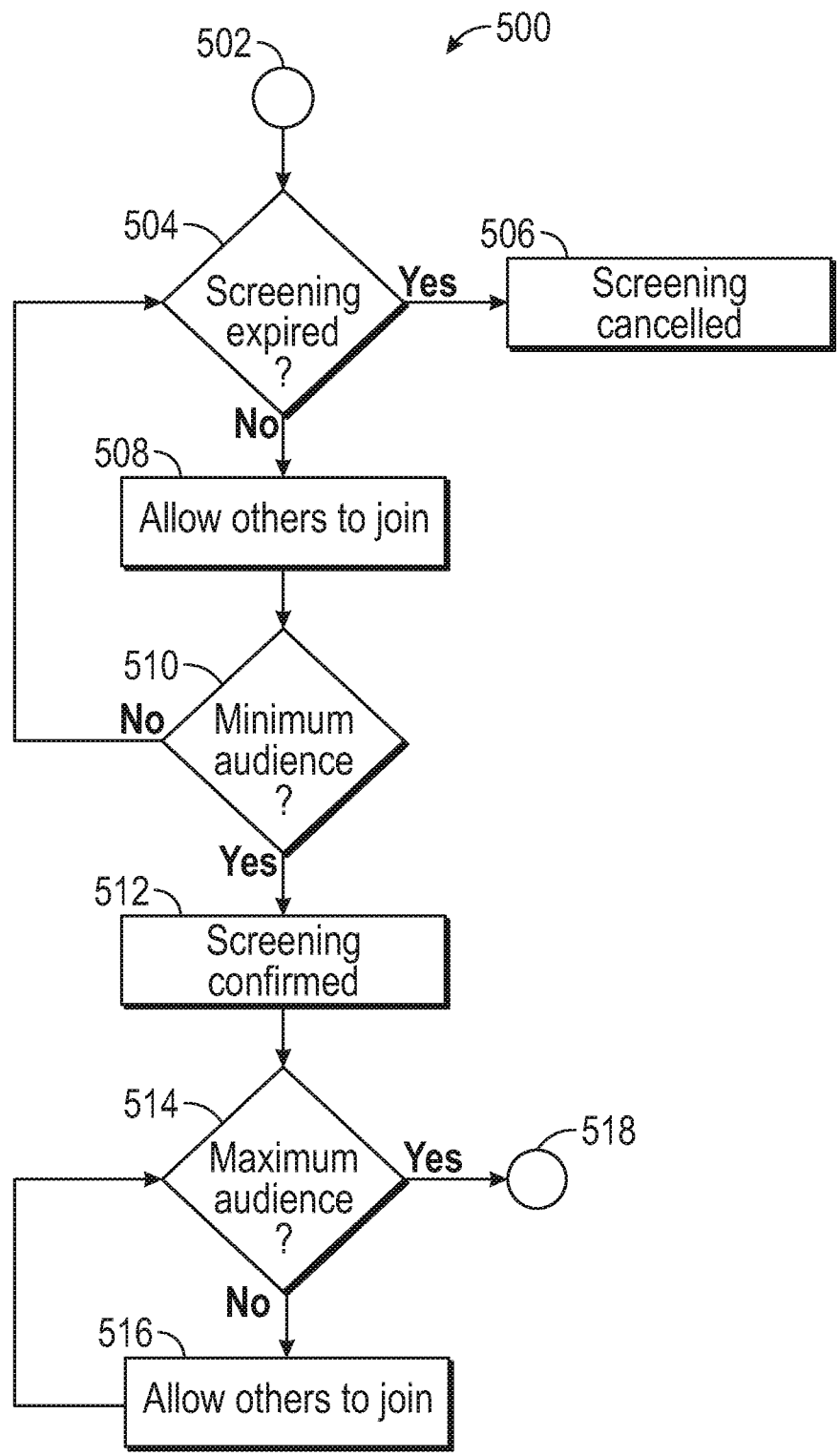
FIG. 5 illustrates a process for confirming a crowd-sourced screening according to examples of the disclosure.

FIG. 5 illustrates a process 500 for confirming a crowd-sourced screening according to examples of the disclosure. In some examples, process 500 can be used as a subroutine at step 308 of process 300. For example, process 500 can be invoked by process 300 at step 308 of FIG. 3 after a user has created a new screening (e.g., after process 400 of FIG. 4 is performed). It should be understood that process 500 can be implemented in a mobile app, a website, or any other computer program that can be run on a device and/or computer.

Process 500 starts at step 502. In some examples, screening information about an unconfirmed screening is received at step 502 of process 500 (e.g., a screening that is created by process 400 of FIG. 4). This screening information can include the movie, cinema theater, and date and time of the screening. The screening information can also include the expiration date (and/or time) of the screening, the number of users that joined the screening, whether the screening is public or private, and/or information about the selected cinema theater, including seating information, available seats, capacity, the minimum audience required to confirm the screening.

At step 504, process 500 determines if the screening has expired (e.g., if the expiration date and/or time has passed). In accordance with a determination that the screening has not expired, process 500 continues to step 508, as described below. In accordance with a determination that the screening has expired, process 500 continues to step 506, as described below. In some examples, the expiration date and/or time can be a date and/or time preceding the screening date and/or time. For example, the expiration date and time can be hours before the screening. In other examples, the expiration date can be a date before for the screening (e.g., a day, week, month before the screening date and/or time). In some examples, the expiration date and time can be the date and time of the screening. In some examples, the expiration date is set by a system administrator by default. In other examples, the expiration date is set by each cinema theater. At step 506, process 500 will notify the user that created the screening and any other users that joined the screening that the screening expired and/or otherwise cancelled (e.g., via email, text, and/or automated phone call). In some embodiments, process 500 will also notify the cinema theater selected for the expired screening. In this way, the cinema theater will be able to schedule another screening at the selected date and time. In some examples, process 500 will keep track of all users that joined a screening that expired or cancelled (including the user that created the screening) and, optionally, notify them if a similar screening is scheduled at a future date (e.g., the same movie is scheduled for a screening at the same or a different cinema theater). In some examples, process 500 will also notify users that joined the expired or canceled screening when a new screening of similar content (e.g., a movie sequel, a movie prequel, another movie with the same lead actor) is created.

At step 508, process 500 allows users to join the screening. In the preferred embodiment of the present invention, process 500 provides for display the screening as part of a plurality of available screenings (e.g., screenings that a user can join). For example, in some embodiments, the plurality of available screenings can include all of the screenings scheduled at cinema theaters within a threshold distance from the location of the device or computer used to browse the screenings. In some embodiments, the plurality of available screenings can include all of the screenings scheduled at cinema theaters within a threshold distance from a location entered by a user. In some examples, the threshold distance is a default distance (e.g., 25 miles). In other examples, the threshold distance is defined by a user. In some embodiments, the screening can be presented for display when a user searches for the selected movie or browses movie screenings at the cinema theater at which the screening is scheduled. In the preferred embodiment, to join a screening, a user must enter payment information (e.g., the user must purchase at least one ticket to join the screening). Process 500 will keep track of how many users join a screening. Process 500 will continue to step 510 once at least one user joins the screening. In some examples, process 500 will wait at step 508 until a user joins the screening or the screening expires. If the screening expires before a user joins the screening, process 500 will terminate and the screening will be cancelled (e.g., step 506 will be performed).

At step 510, process determines whether a threshold number of users joined a screening (e.g., whether a minimum audience was met). In some examples, the threshold number of users is a default number (e.g., 35 users). In other examples, the threshold number of users is defined by the cinema theater. In accordance with a determination that the minimum number of users did not join the screening (e.g., a minimum audience was not met), process 500 repeats step 504 (and any subsequent steps). In accordance with a determination that the minimum number of users joined the screening (e.g., a minimum audience was met), process 500 continues to step 512.

At step 512, process 500 confirms the screening. For example, the process 500 will reserve the cinema theater at the date and time selected for the screening (e.g., as described above with reference to FIGS. 3-4). In some embodiments, this can be done automatically (e.g., without further action from the cinema theater). In other embodiments, process 500 will send a request to the cinema theater for confirmation. In such a case, a cinema theater will confirm or cancel the screening. Once the screening is confirmed, process 500 will then notify the users that joined the screening (including the user that created the screening) that the screening is confirmed (e.g., via email, text, and/or automated phone call). In one embodiment, at step 512, process 500 will email the users that joined the screening at step 508 and the user that originally created the screening the tickets for admission to the screening. In one embodiment, process 500 will email tickets for admission to the screening at the time a user joins the screening at step 508 of process 500. In one embodiment, tickets are stored and managed within the mobile app and are only accessible through the mobile app once the screening is confirmed. Once the screening is confirmed at step 512, process 500 optionally continues to step 514.

At step 514, process determines whether a maximum number of users joined a screening (e.g., whether a maximum audience was met). In some examples, the maximum number of users is a default number (e.g., the capacity of the auditorium of the cinema theater for the screening). In other examples, the maximum number of users is defined by the cinema theater (which may be fewer than the capacity of the auditorium of the cinema theater for the screening). In accordance with a determination that the maximum number of users did not join the screening (e.g., a maximum audience was not met), process 500 continues to step 516. In accordance with a determination that the maximum number of users joined the screening (e.g., a maximum audience was met), process 500 continues to step 518 and process 500 ends.

At step 516, process 500 allows additional users to join the screening (e.g., as described above with reference to step 508). Process 500 will return to step 514 once another user joins the screening. In some examples, process 500 will wait at step 508 until a user joins the screening or the screening is completed (e.g., the movie is screened at the selected date and time).

Figure 6A:
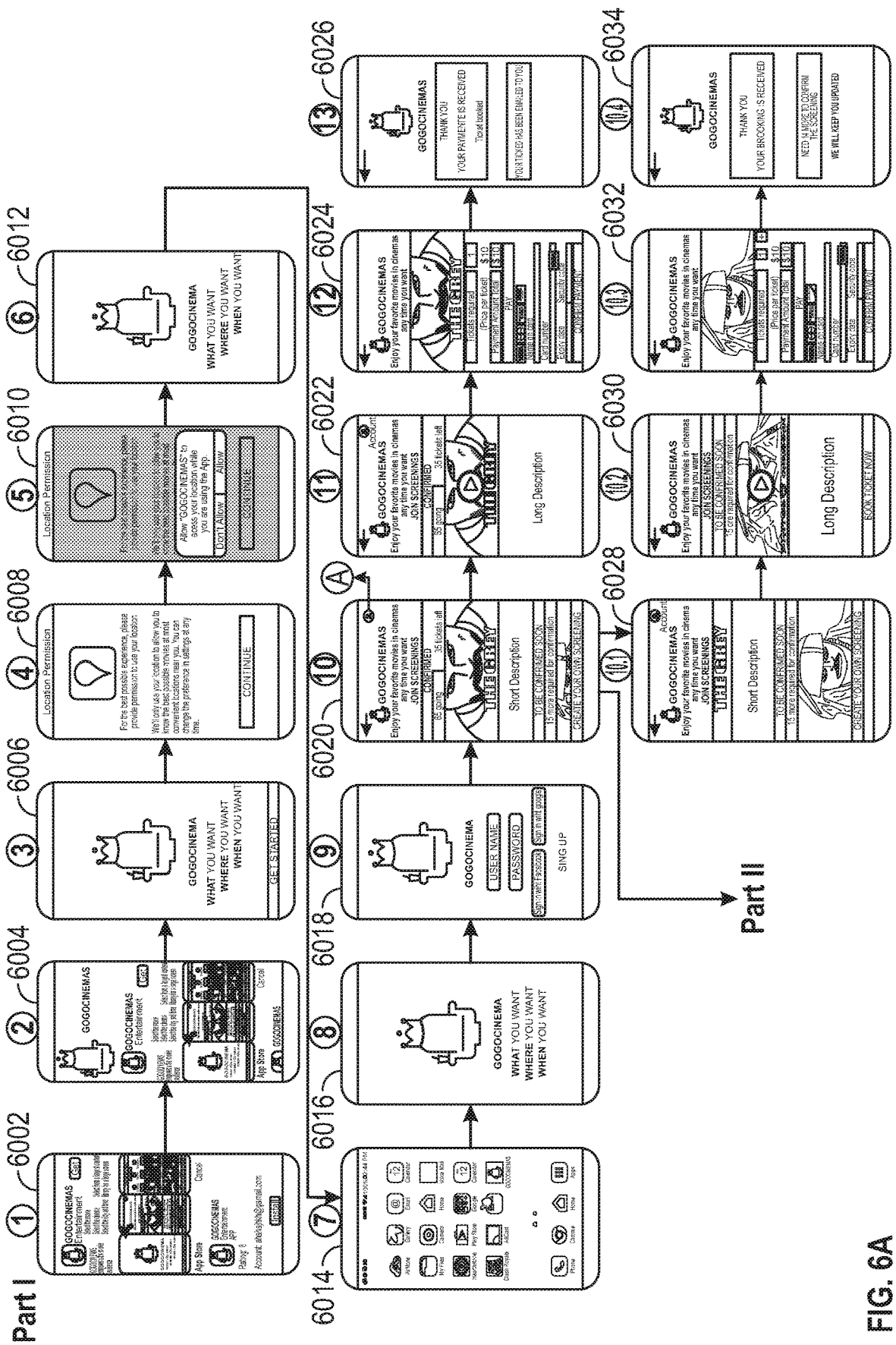
FIGS. 6A-6R illustrate user interfaces for crowd-sourcing a movie screening according to examples of the disclosure.
Figure 6B:
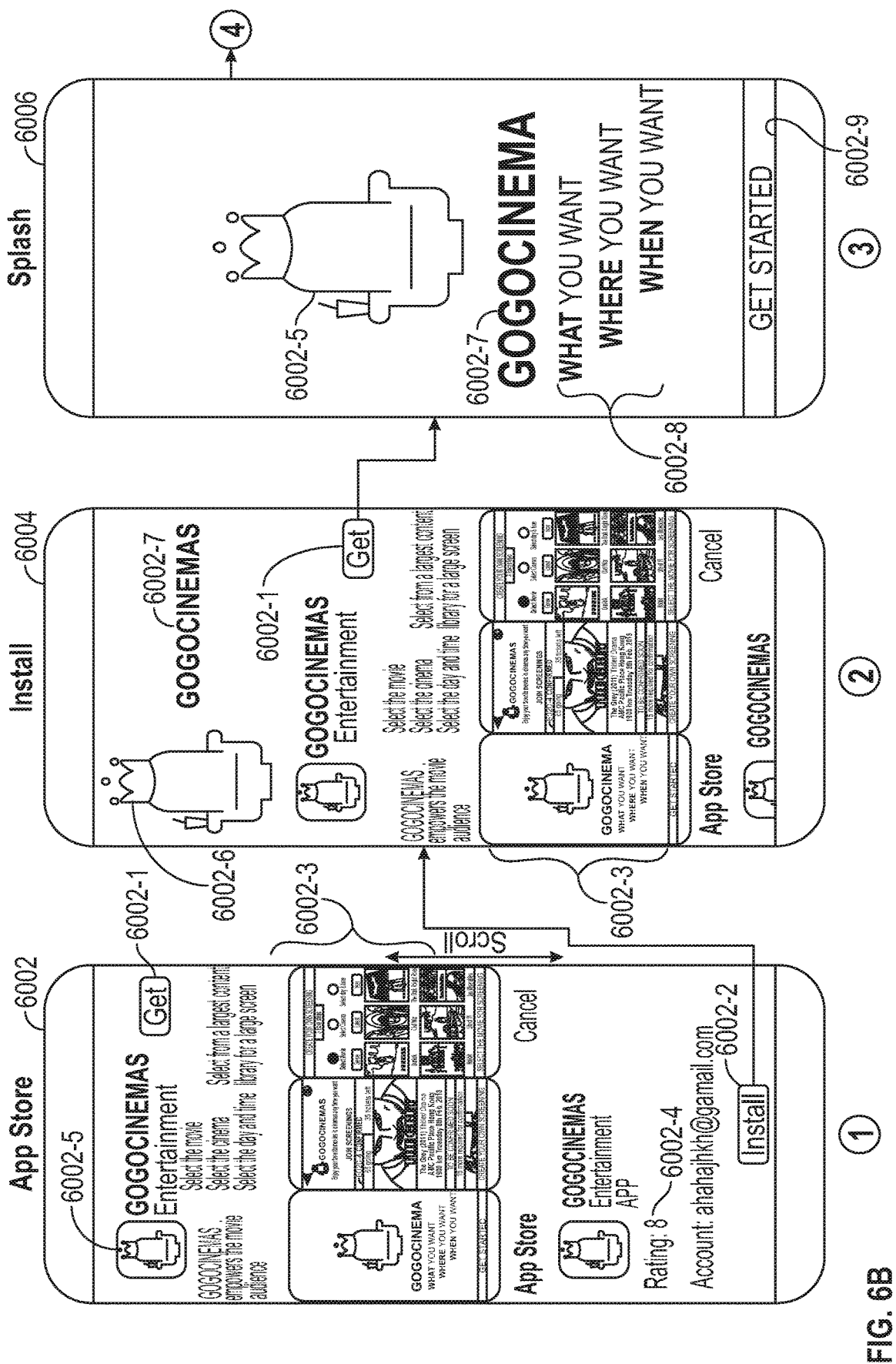
Figure 6C:
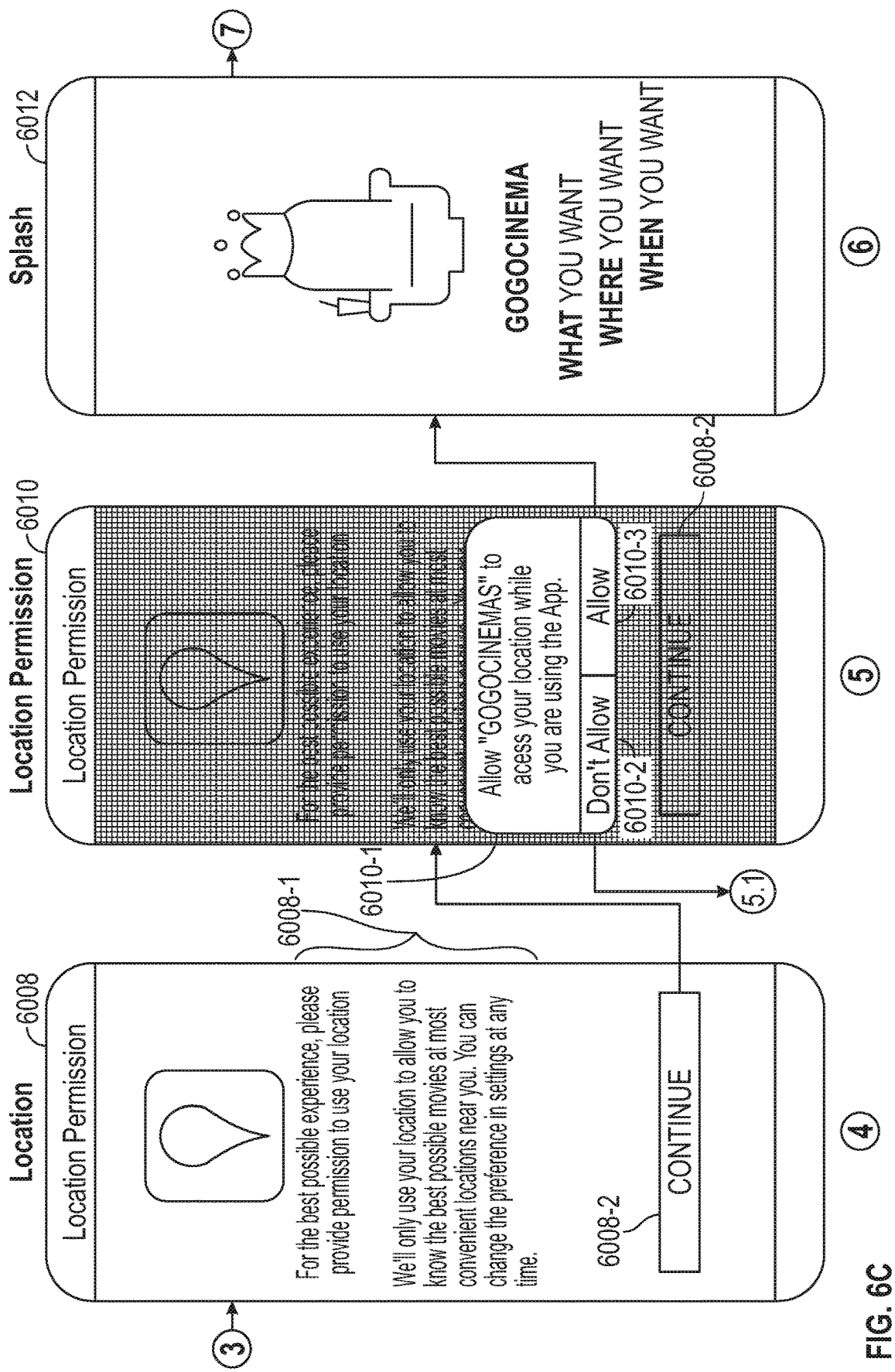
Figure 6D:
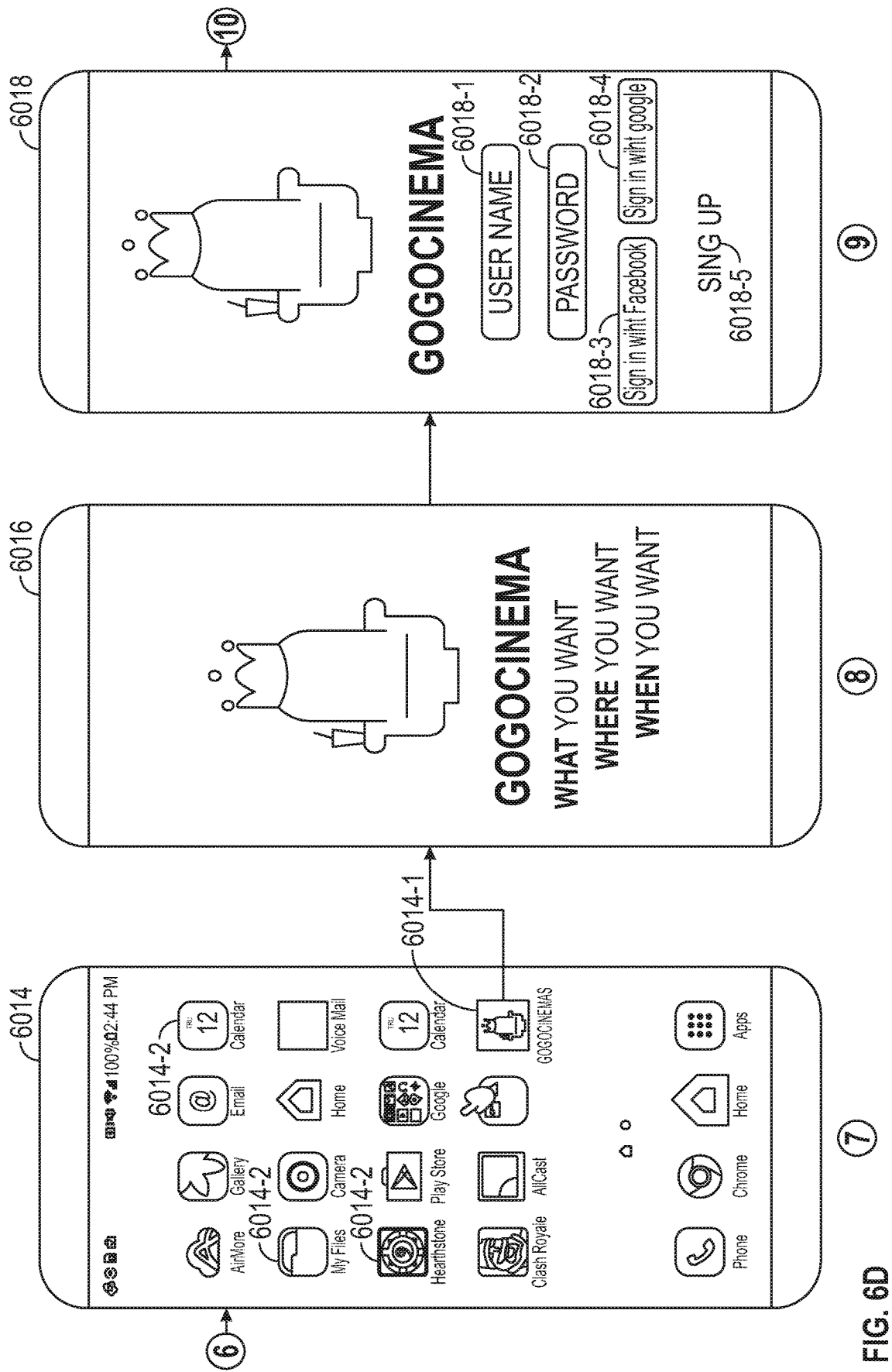
Figure 6E:
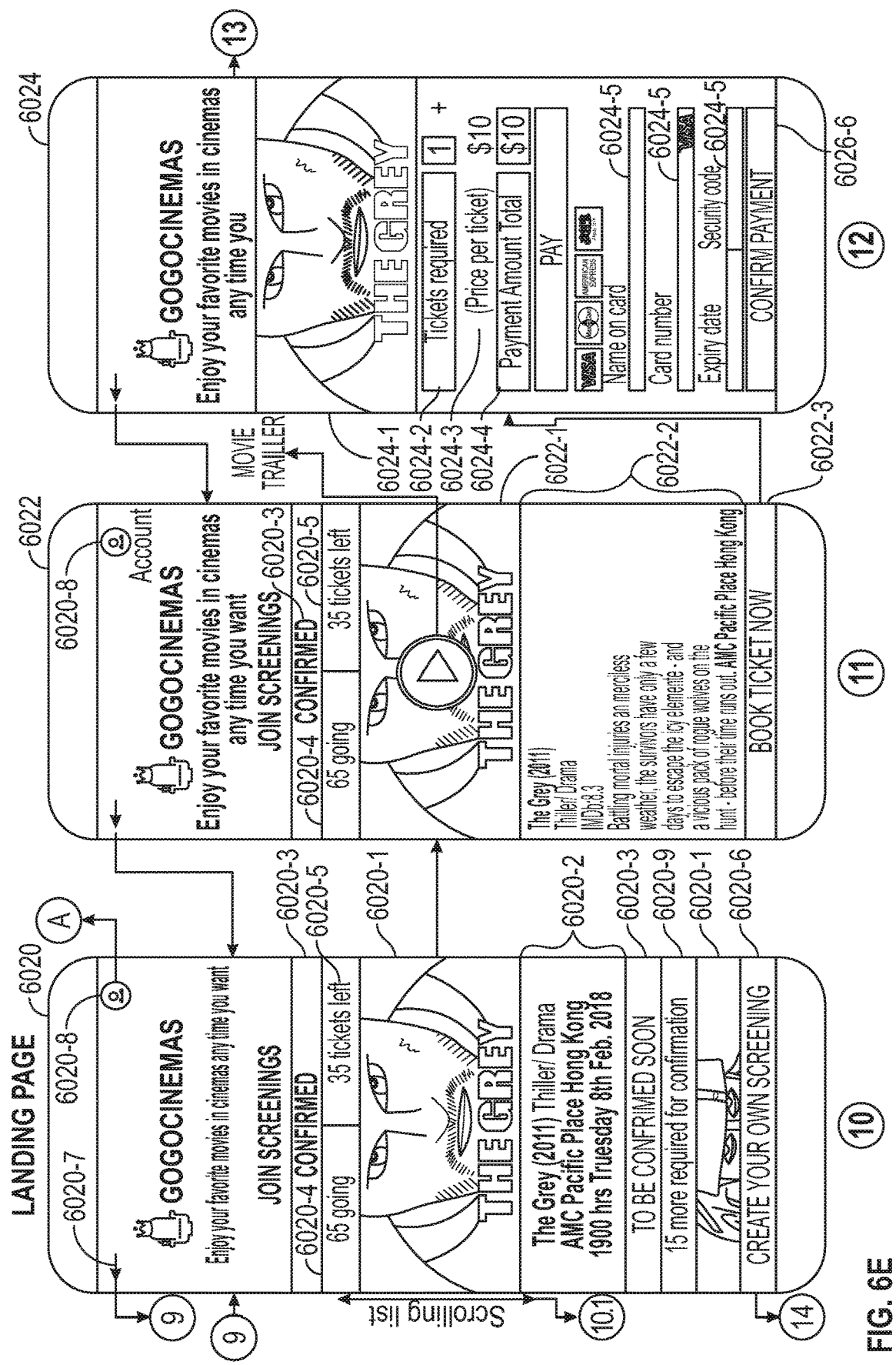
Figure 6F:
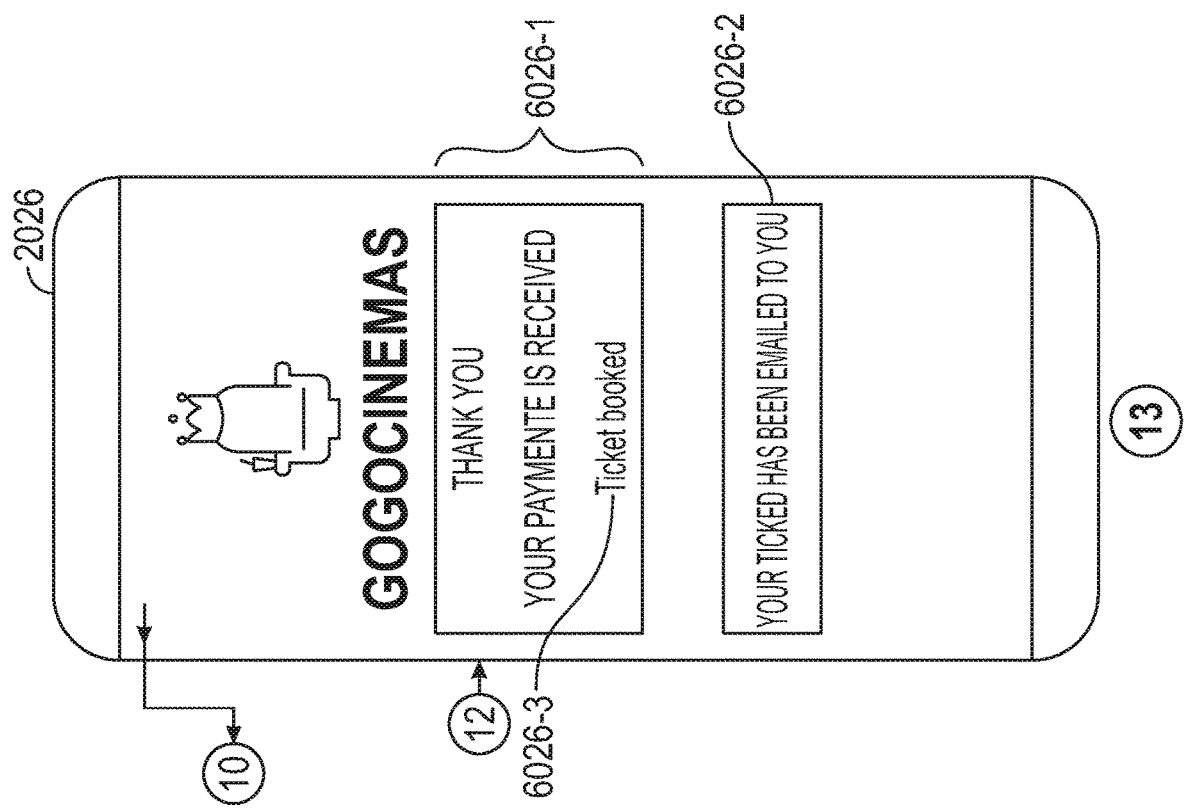
Figure 6G:
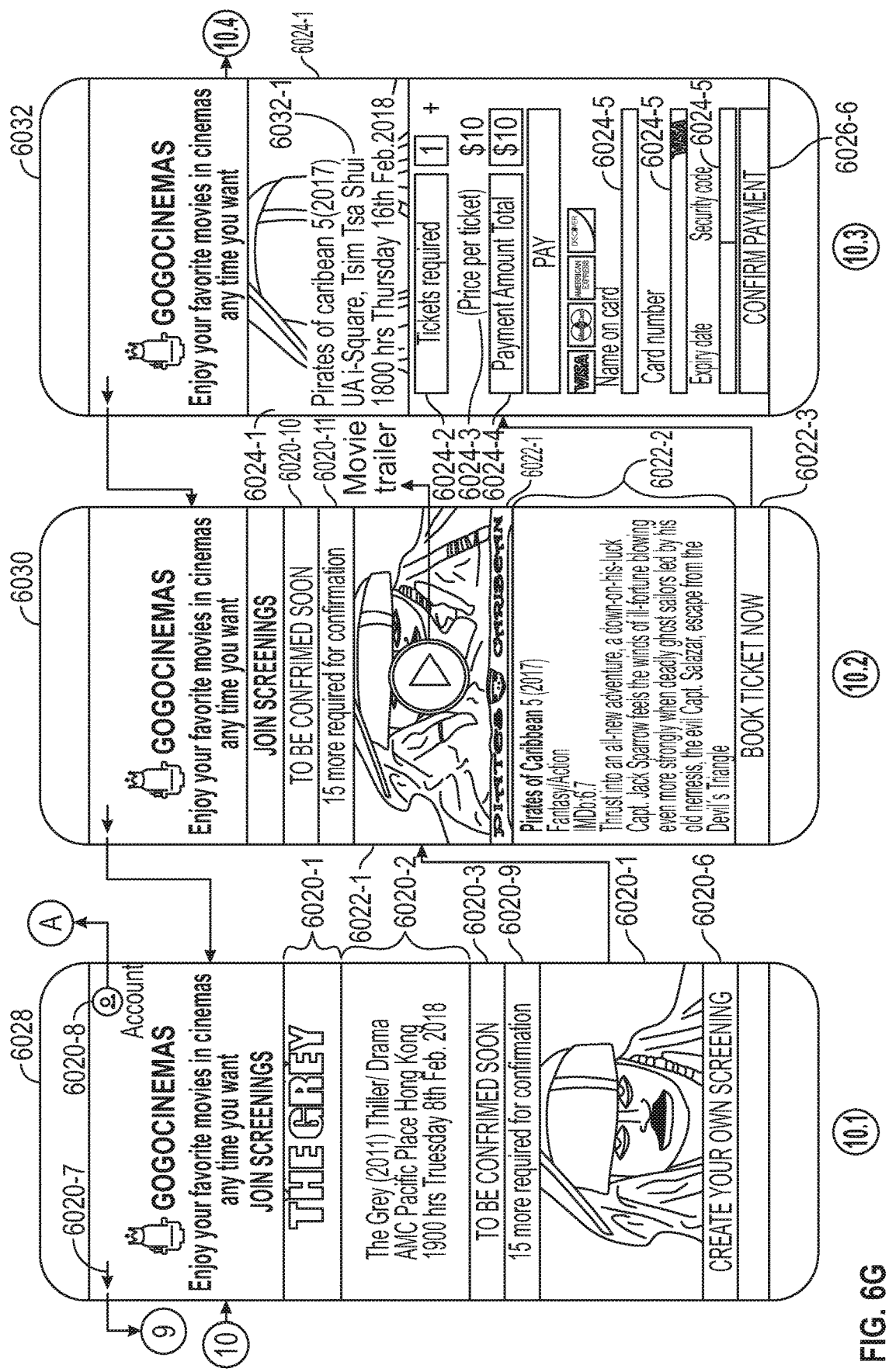
Figure 6H:
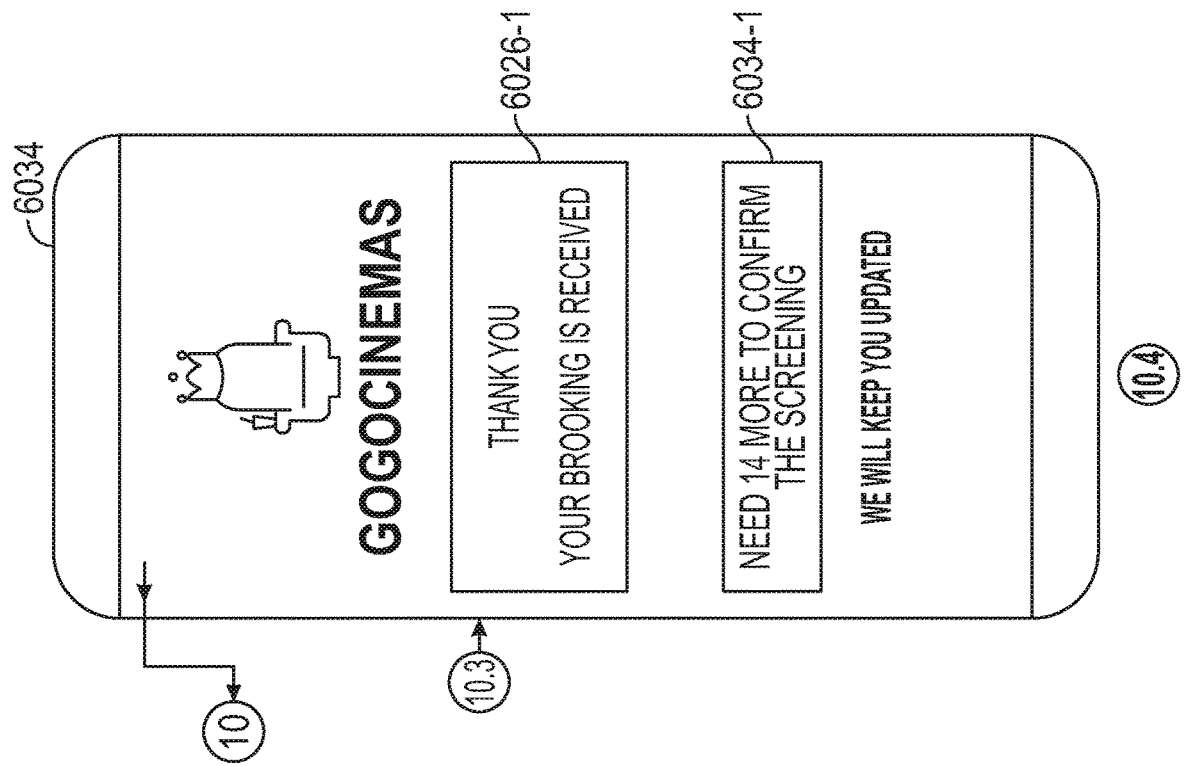
Figure 6I:
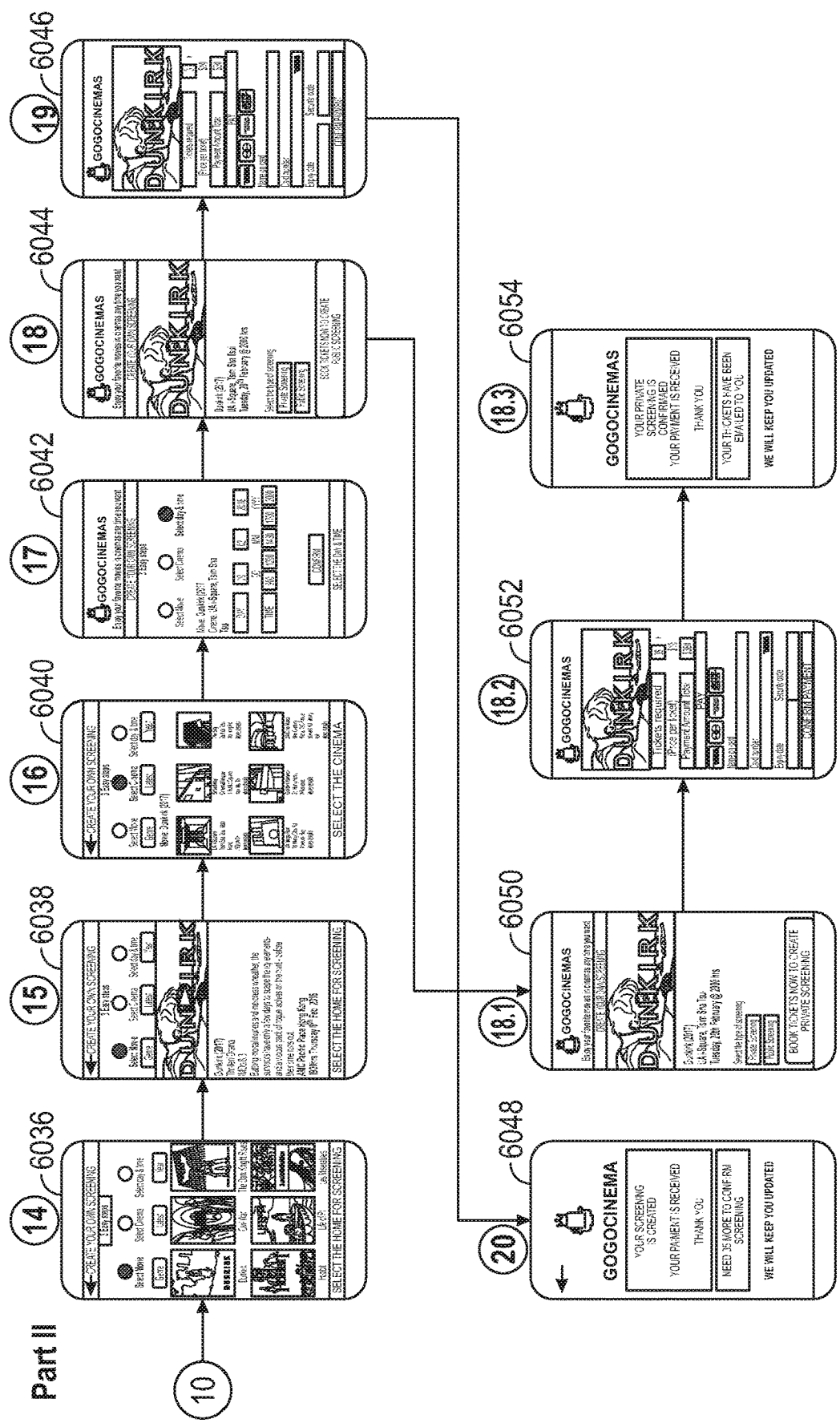
Figure 6J:
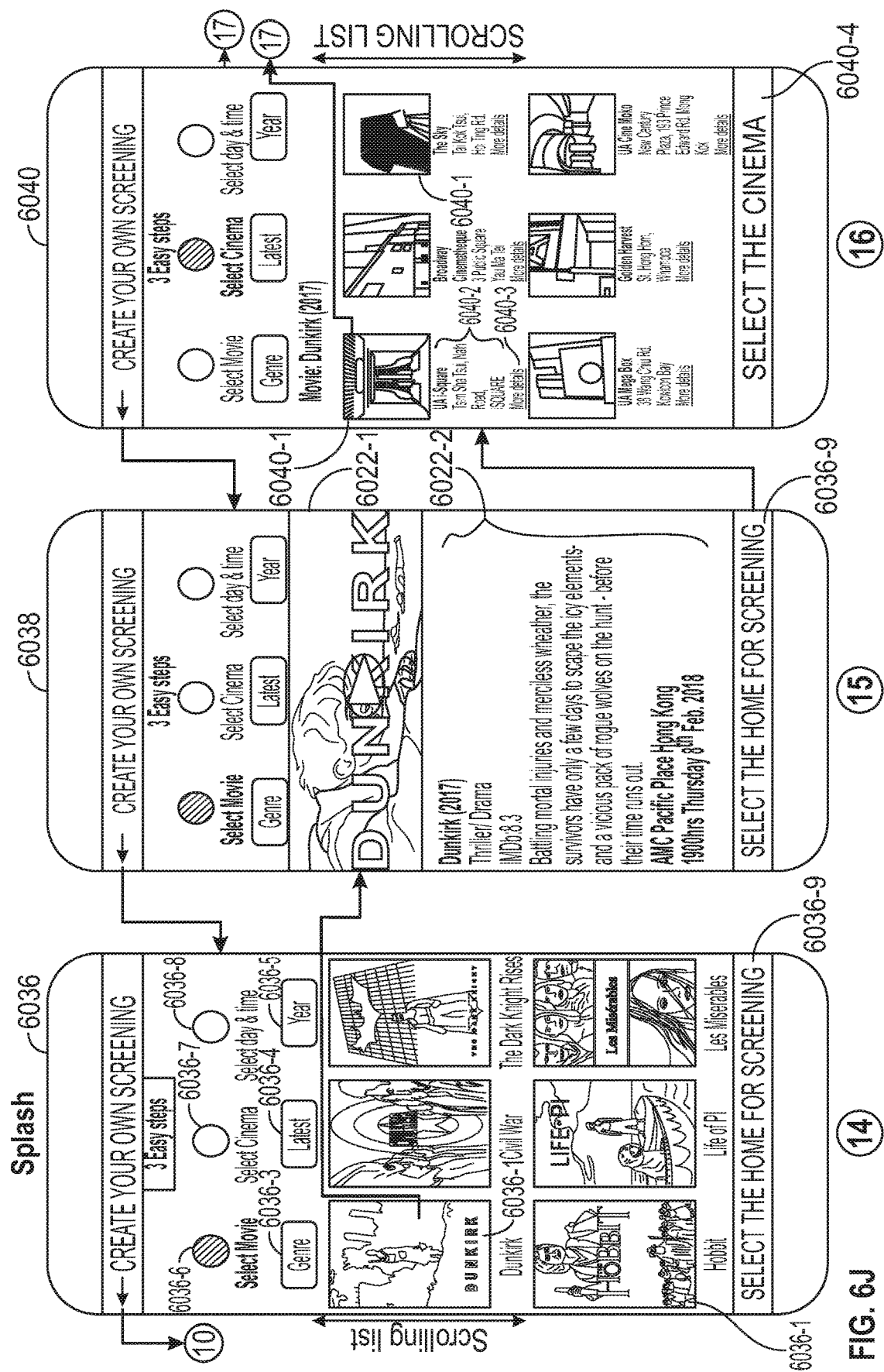
Figure 6K:
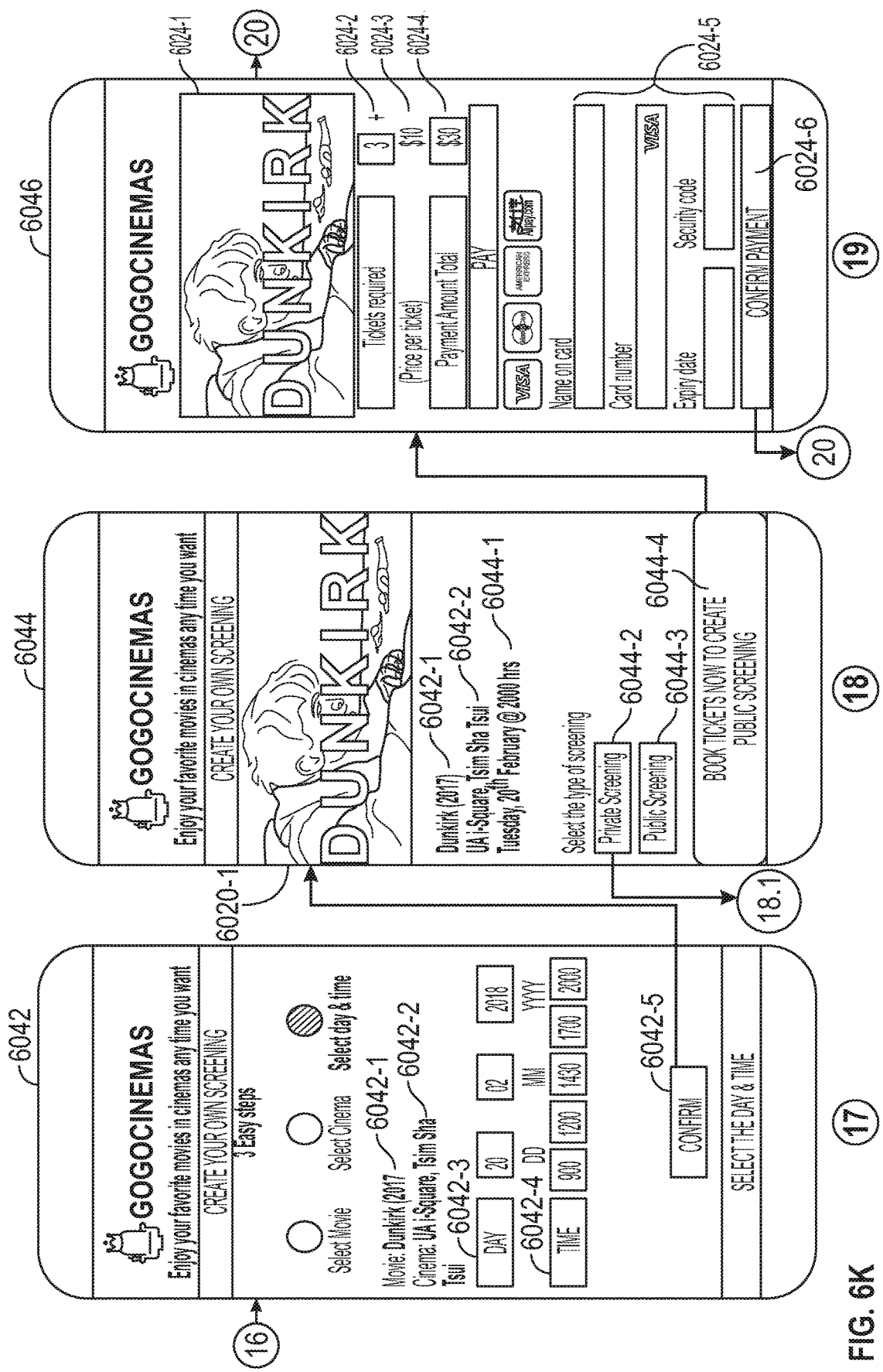
Figure 6M:
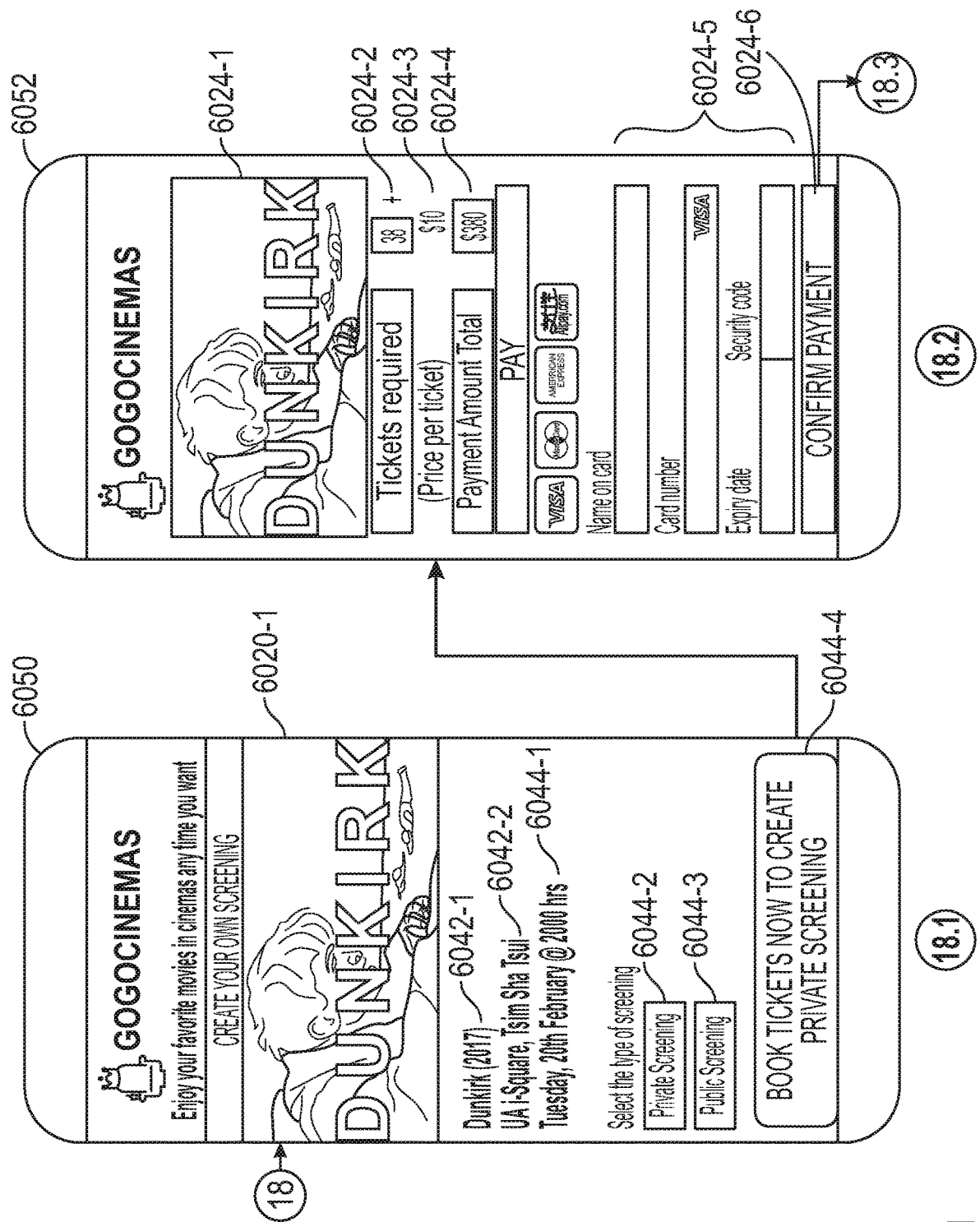
Figure 60:
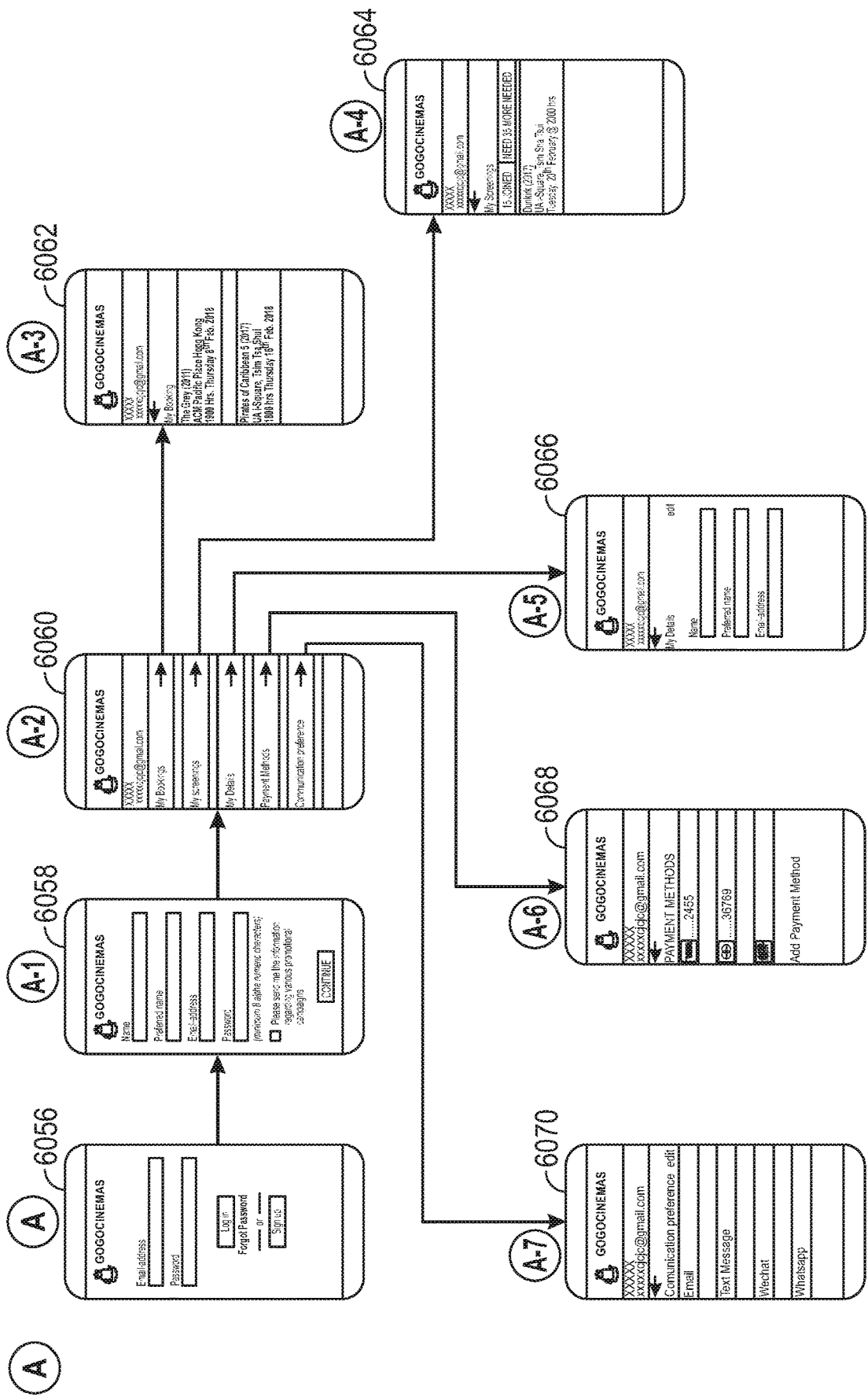
Figure 6P:
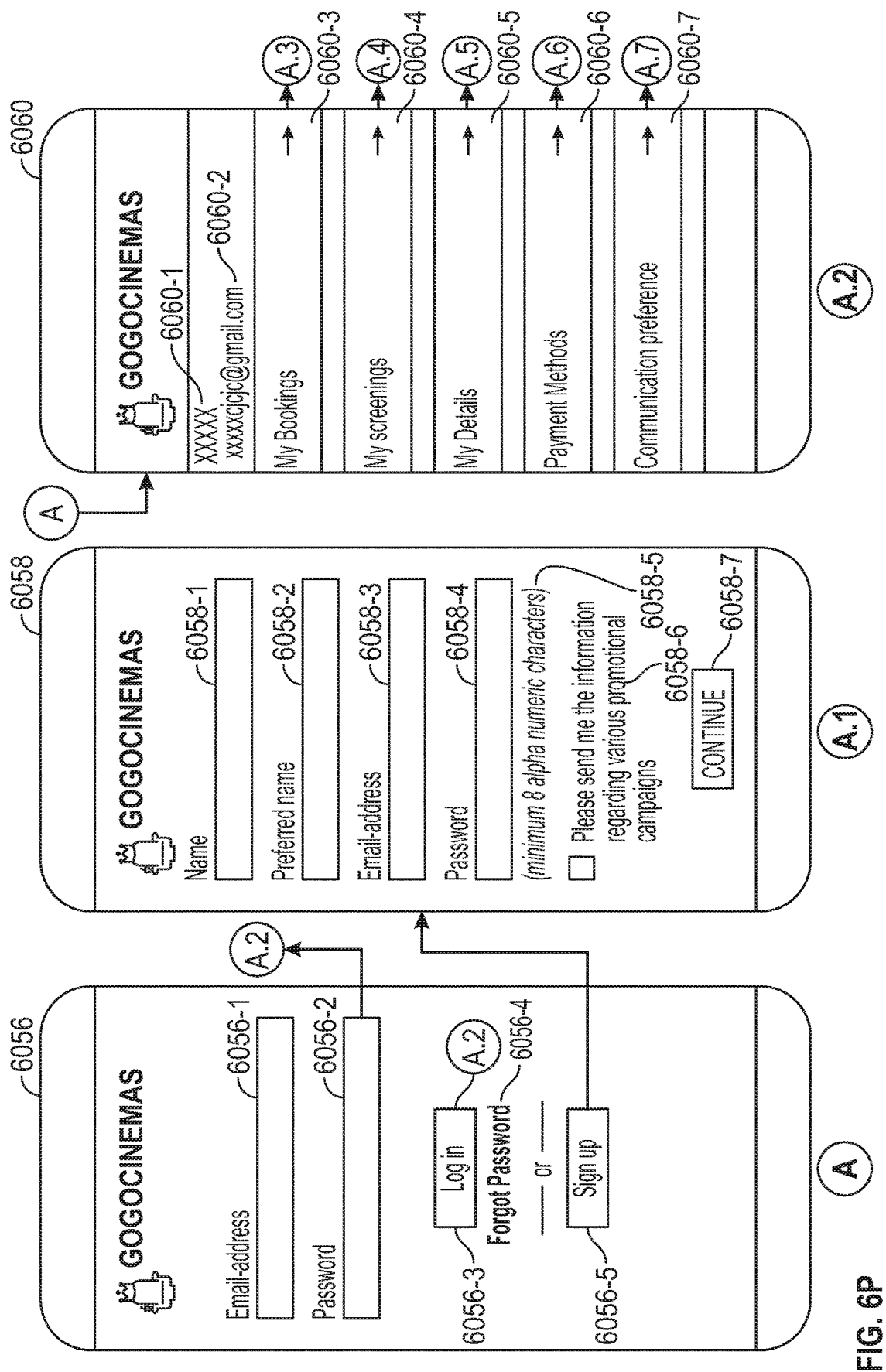
Figure 6Q:
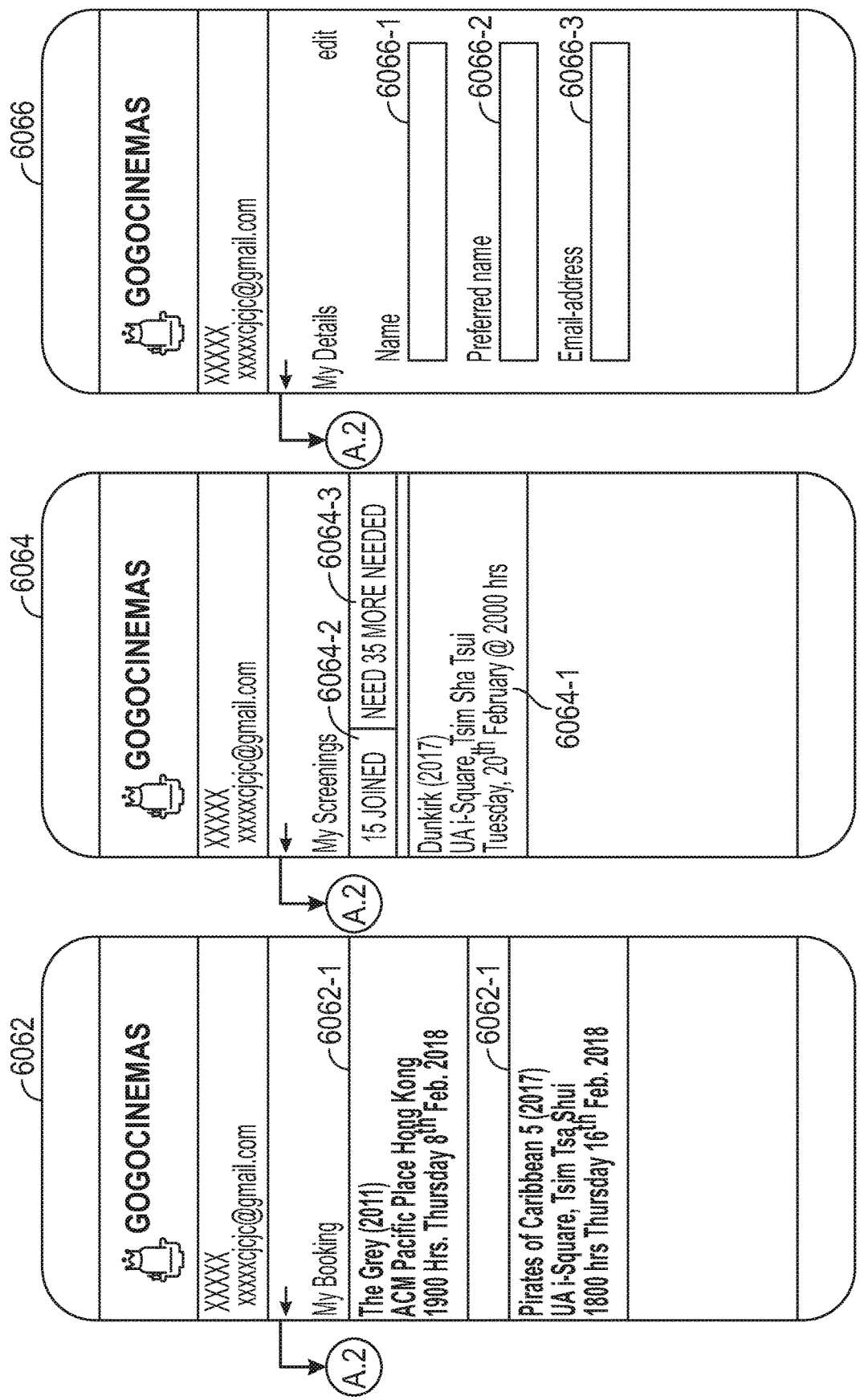
Figure 6R:
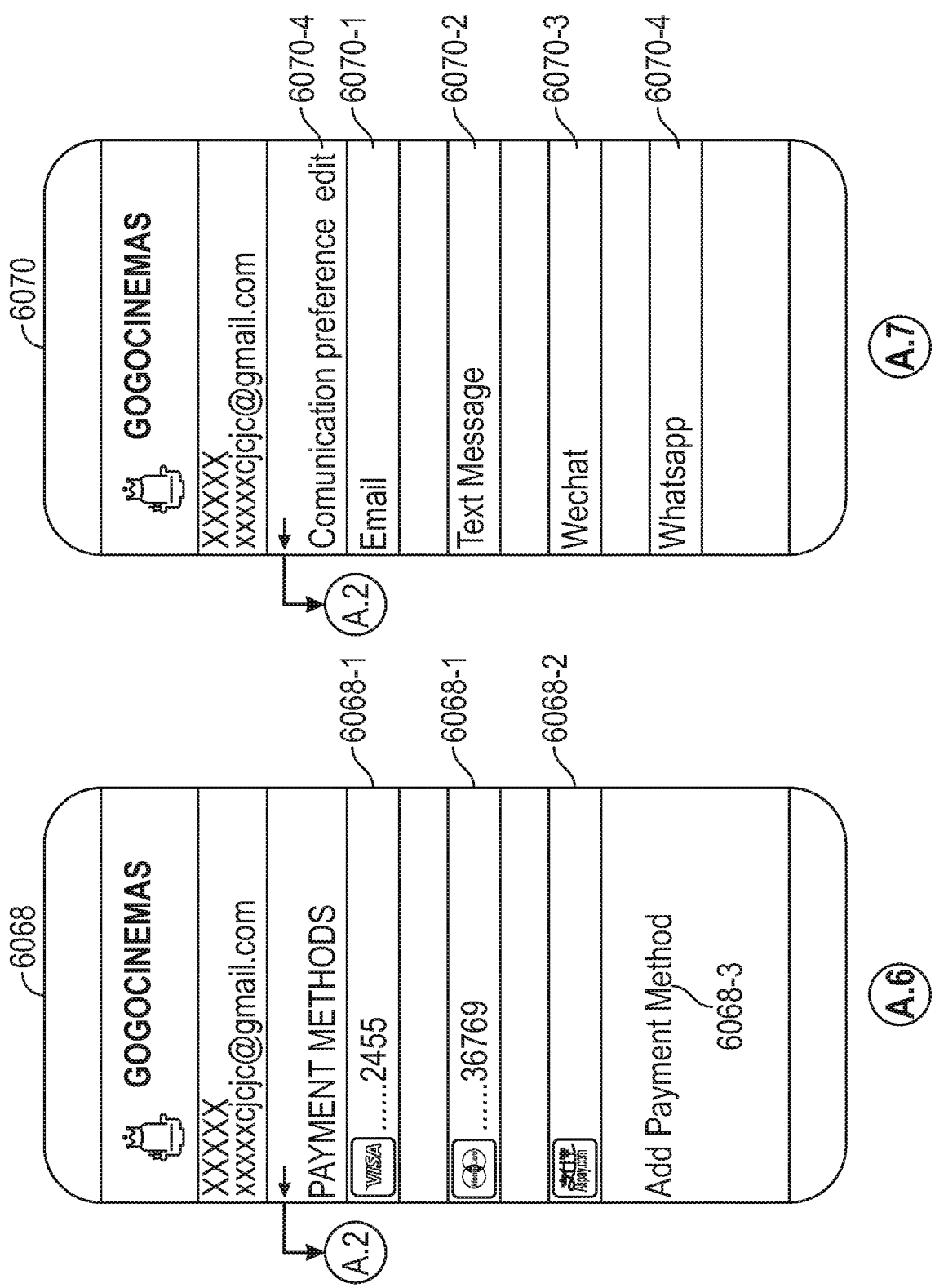

FIGS. 6A-6R illustrate user interfaces for crowd-sourcing a movie screening according to examples of the disclosure. The user interfaces illustrated in these figures are used to illustrate the processes described above when implemented as a mobile app. For example, the user interfaces of FIGS. 6A-6R can be displayed at device 102A of FIG. 1 and can be displayed in response to user input, such as on a touch-screen surface of device 102A of FIG. 1 (e.g., as described above with reference to FIG. 2). It should be noted that while the user interfaces in the figures show how a movie screening can be crowd-sourced, other types of content (e.g., live events, television programs, pay-per-view events, or any other content that a user would otherwise be able to consume at home or a cinema theater) can be crowd-sourced for screening at a cinema theater.

FIG. 6A illustrate user interfaces 6002-6034 for downloading a mobile app, setting up the mobile app, and joining screenings according to examples of the disclosure. These user interfaces will be discussed next with reference to FIGS. 6B-6H.

FIG. 6B illustrates user interfaces 6002-6006 for downloading a movie screening crowd-sourcing app according to examples of the disclosure. User interface 6002 illustrates an "App Store" containing information about the movie screening crowd-sourcing app, including buttons 6002-1 and 6002-2 to initiate the downloading and installation of the mobile app, screenshots 6002-3 of the mobile app, rating information 6002-4, and icon 6002-5. User interface 6002 can be scrollable to display more or less information from the App Store about the mobile app. For example, user interface 6004 illustrates user interface 6002 scrolled down to show a larger icon 6002-6 and title 6002-7. User interface 6006 illustrates a splash page that can, optionally, be displayed after the mobile app is installed on the device. Splash page 6006 can include an icon 6002-5, title 6002-7, catch phrase 6002-8, and a button 6002-9 to proceed to the mobile app.

FIG. 6C illustrates user interfaces 6008-6012 for configuring a movie screening crowd-sourcing app according to examples of the disclosure. For example, user interface 6008 illustrates user interface 6008 with information 6008-1 indicating why the mobile app uses the device's location and a button 6008-2 to allow the user to enable or disable the mobile app's access to the device's locations (e.g., access to location interface 210 as described above with reference to FIG. 2). User interface 6010 illustrates pop-up window 6010-1 that is displayed when button 6008-2 is selected (e.g., through tough input). Pop-up window 6010-1 can include a button 6010-3 to allow the mobile app to access the device's location (e.g., interact with location interface 210 as described above with reference to FIG. 2) and button 6010-3 to not allow the mobile app to access the device's location (e.g., interact with location interface 210 as described above with reference to FIG. 2). When location permission is not granted by the user at user interface 6010, the processes described above will use an address, city, and/or zip code manually entered by the user. User interface 6012 illustrates a splash page that can be displayed after the location permission is allowed or not allowed.

FIG. 6D illustrates user interfaces 6014-6018 for launching a movie screening crowd-sourcing app according to examples of the disclosure. For example, user interface 6014 illustrates a home screen of a device with a plurality of icons 6014-2 representing various mobile apps installed on the device, including a movie screening crowd-sourcing app 6014-1 according to examples of the disclosure. User interface 6016 illustrates a splash page that can be displayed when mobile app 6014-1 is launched through user input. In some examples, splash page 6016 can be displayed briefly (e.g., for a few seconds) before user interface 6018 is displayed. In other examples, splash page 6016 can be displayed when a user touches the screen, after which user interface 6018 is displayed. User interface 6018 illustrates a user login screen including fields 6018-1 and 6018-2 for entering a username and password, respectively. Login screen 6018 can also include button 6018-3 and 6018-4 that allow the user to login using the credential from a third-party system (e.g., Facebook or Google). Login screen 6018 can also include link or button 6018-5 to enable the user to create an account for the mobile app.

FIGS. 6E-6H illustrate user interfaces 6020-6034 for joining a screening according to examples of the disclosure. User interface 6020 of FIG. 6E illustrates how a user can scroll through a plurality of available screenings (e.g., as described above with reference to FIG. 5). In some examples, the plurality of available screenings can be received from a first server (e.g., server 108 of FIG. 1). For example, user interface 6020 illustrates movie poster images 6020-1, short movie description 6020-2 (e.g., title, release date, genre, screening cinema theater and screening date and time), a status of the screening 6020-3 (e.g., whether the screening is confirmed), the number of confirmed users attending the screening 6020-4, the number of available tickets 6020-5 for the screening, a button or link 6020-6 for initiating a process for creating a screening (e.g., as described above with reference to FIG. 4), a back button 6020-7 (e.g., to return to the previously displayed user interface), an icon or button 6020-8 to display user account settings, and the number of users required to confirm a screening 6020-9. User interface 6022 illustrates a movie detail page that can be displayed when a movie is selected at user interface 6020. For example, movie detail page 6022 can include a link to a movie trailer 6022-1, a detailed movie description 6022-2 (e.g., title, release date, genre, movie rating, plot description, screening cinema theater and screening date and time), a button or link 6022-3 for booking a ticket to the screening (e.g., joining the screening as described above with reference to FIG. 5), a status of the screening 6020-3 (e.g., whether the screening is confirmed), the number of confirmed users attending the screening 6020-4, and the number of available tickets 6020-5 for the screening. User interface 6024 illustrates a payment page that is displayed when button or link 6022-3 of user interface 6022 is selected by the user. Payment page 6024 can include movie poster image 6024-1, the number of tickets to purchase 6024-2, the price per ticket 2024-3, the total amount due 2024-4 for the number of tickets selected, fields to enter payment information 6024-5 (e.g., name, credit card number, expiration date, and security code), and a button or link 2026-6 for the payment to be confirmed/processed. FIG. 6F illustrates a payment confirmation user interface 6026 that can be displayed after the payment is processed. Payment confirmation user interface 6026 can include a confirmation message 6026-1 and a status of the tickets 6026-2 (e.g., whether the purchased tickets were emailed).

FIGS. 6G-6H illustrate user interfaces 6028-6034 for joining a screening that has not been confirmed according to examples of the disclosure. For example user interface 6028 of FIG. 6G illustrates how a user can scroll through a plurality of available screenings (e.g., as described above with reference to FIG. 5). In some examples, the plurality of available screenings can be received from a first server (e.g., server 108 of FIG. 1). For example, user interface 6028 illustrates movie poster images 6020-1, short movie description 6020-2 (e.g., title, release date, genre, screening cinema theater and screening date and time), a status of the screening 6020-3 (e.g., whether the screening is confirmed), a button or link 6020-6 for initiating a process for creating a screening (e.g., as described above with reference to FIG. 4), a back button 6020-7 (e.g., to return to the previously displayed user interface), an icon or button 6020-8 to display user account settings, the number of users required to confirm a screening 6020-9. User interface 6030 illustrates a movie detail page that can be displayed when a movie is selected at user interface 6028. For example, movie detail page 6030 can include a link to a movie trailer 6022-1, a detailed movie description 6022-2 (e.g., title, release date, genre, movie rating, plot description, screening cinema theater and screening date and time), a button or link 6022-3 for booking a ticket to the screening (e.g., joining the screening as described above with reference to FIG. 5), a status of the screening 6020-3 (e.g., whether the screening is confirmed), and the number of users required to confirm a screening 6020-9. User interface 6032 illustrates a payment page that is displayed when button or link 6022-3 of user interface 6030 is selected by the user. Payment page 6032 can include movie poster image 6024-1, the number of tickets to purchase 6024-2, the price per ticket 2024-3, the total amount due 2024-4 for the number of tickets selected, fields to enter payment information 6024-5 (e.g., name, credit card number, expiration date, and security code), and a button or link 2026-6 for the payment to be confirmed/processed. In some examples, payment page 6032 can include overlay 6032-1 over image 6024-1 that includes, for example, the title of the movie, the cinema theater and the date and time for the screening. FIG. 6H illustrates a payment confirmation user interface 6034 that can be displayed after the payment is processed. Payment confirmation user interface 6034 can include a confirmation message 6026-1 and a status of the screening 6034-1 (e.g., whether the screening was confirmed and/or how many users must join to confirm the screening).

FIG. 6I illustrates user interfaces 6036-6054 for creating a screening according to examples of the disclosure (e.g., as described above with reference to FIG. 4). These user interfaces will be discussed next with reference to FIGS. 6J-6N.

FIG. 6J illustrates user interfaces 6036-6040 for selecting a movie and a cinema theater (e.g., as described above with reference to FIG. 4). For example, user interface 6036 displays a plurality of available movies 3036-1 to choose from. In some examples, user interface 6036 can also display the titles 2036-2 of the plurality of movies. In some examples, the plurality of available movies can be received from a first server (e.g., server 108 and/or 116 of FIG. 1). In some examples, user interface 6036 can include filters to help a user find a movie, including a genre filter 6036-3 (e.g., a filter that allows the user to select one or more genres), a latest filter 6036-4 (e.g., that allows a user to only view recently released movies), a year filter 6036-5 (e.g., a filter that allows the user to select all movies that were released on a particular year). User interface 6036 can also include status indicators 6036-6 through 6036-8 for indicating what step in the process for creating a screening the user is in (e.g., as described above with reference to FIG. 4). A user can select a movie by selecting one of the plurality of available movies by touching a movie poster image 6036-1 or by moving a selection indicator (not shown) over a movie poster image 6036-1 and selecting a button or link 6036-9 for selecting the movie. User interface 6038 is displayed in response to a user touching a movie poster image at user interface 6036. User interface 6038 illustrates a movie detail page that can include a link to a movie trailer 6022-1, a detailed movie description 6022-2 (e.g., title, release date, genre, movie rating, plot description, and, optionally, any existing screening information), and a button or link 6036-9 for selecting the movie. User interface 6040 is displayed in response to a movie being selected at user interface 6036 or 6038, and can include a plurality of available cinema theaters 6040-1 (e.g., as described above with reference to FIG. 4). The plurality of available cinema theaters 6040-1 can be represented by images of the theaters. User interface 6040 can also display additional cinema theater information 6040-2 (e.g., the name of the cinema theater and/or address) and a link 6040-3 for additional details about each of the plurality of available cinema theaters. Moreover, user interface 6040 can also include a button or link 6040-4 for selecting a cinema theater.

User interface 6042 of FIG. 6K illustrates a page for selecting a date and time for the screening (e.g., as described above with reference to FIG. 4). For example, user interface 6042 can include the selected movie 6042-1, the selected cinema theater 6042-2, a field to enter or select a date 6042-3, a field to enter or select a time 6042-4, and a button or link 6042-5 to confirm the selected date and time. User interface 6044 illustrates a screening confirmation page that can include a movie poster image 6020-1 of the selected movie, the title 6042-1 of the selected movie, the selected cinema theater 6042-2 for the screening, the date and time 6044-1 for the screening, and buttons 6044-2 and 6044-3 to designate the screening as a private screening or a public screening, respectively. Moreover, user interface 6044 can also include a button or link 6044-4 for booking tickets for the screening. User interface 6046 illustrates a payment page that is displayed when button or link 6044-4 of user interface 6044 is selected by the user. Payment page 6046 can include movie poster image 6024-1, the number of tickets to purchase 6024-2, the price per ticket 2024-3, the total amount due 2024-4 for the number of tickets selected, fields to enter payment information 6024-5 (e.g., name, credit card number, expiration date, and security code), and a button or link 2026-6 for the payment to be confirmed/processed. FIG. 6L illustrates a payment confirmation user interface 6048 that can be displayed after the payment is processed. Payment confirmation user interface 6048 can include a confirmation message 6026-1 and a status of the screening 6034-1 (e.g., whether the screening was confirmed and/or how many users must join to confirm the screening).

FIGS. 6M-6N illustrate user interfaces 6050-6054 for creating a private screening. User interface 6044 illustrates a screening confirmation page that can include a movie poster image 6020-1 of the selected movie, the title 6042-2 of the selected movie, the selected cinema theater 6042-2 for the screening, the date and time 6044-1 for the screening, and buttons 6044-2 and 6044-3 to designate the screening as a private screening or a public screening, respectively. Moreover, user interface 6050 can also include a button or link 6044-4 for booking tickets for the screening. User interface 6052 illustrates a payment page that is displayed when button or link 6044-4 of user interface 6044 from FIG. 6K or when button or link 6044-4 of user interface 6050 from FIG. 6M is selected by the user. Payment page 6052 can include movie poster image 6024-1, the number of tickets to purchase 6024-2, the price per ticket 2024-3, the total amount due 2024-4 for the number of tickets selected, fields to enter payment information 6024-5 (e.g., name, credit card number, expiration date, and security code), and a button or link 2026-6 for the payment to be confirmed/processed. FIG. 6N illustrates a payment confirmation user interface 6054 that can be displayed after the payment is processed. Payment confirmation user interface 6054 can include a confirmation message 6026-1 and a status of the screening 6034-1 (e.g., whether the screening was confirmed, how many users must join to confirm the screening, whether the tickets for the screening were emailed).

FIG. 6O illustrates user interfaces 6056-6070 for setting up an account and viewing account details for the movie screening crowd-sourcing app. These user interfaces will be discussed next with reference to FIGS. 6P-6R.

User interface 6056 of FIG. 6P illustrates a login screen including fields 6056-1 and 6056-2 for entering a username and password, respectively. Login screen 6056 can also include button 6056-3 to allow the user to login using the entered credentials at fields 6056-1 and 6056-2. Login screen 6056 can also include a link or button 6056-3 to reset the user's password and a link or button 6018-5 to enable the user to create an account for the mobile app. User interface 6058 illustrates a sign up screen for the movie screening crowd-sourcing app. Sign up screen 6058 can include fields 6058-1 through 6058-4 to allow a user to enter a name, a preferred name, an email address, and a password, respectively. In some examples, sign up screen 6058 can also include password requirement information 6058-5 and a check box 6058-6 to allow the movie screening crowd-sourcing app or its back end server (e.g., server 108 of FIG. 1) to send promotional emails to the email address entered at field 6058-3. Sign up screen 6058 can also include a continue button 6058-7 that can only be selected when fields 6058-1 through 6058-4 are correctly filled. In some examples, user interface 6056 can be displayed when button or link 6056-5 of user interface 6056 of FIG. 6P is selected.

User interface 6060 of FIG. 6P illustrates an account details screen for the movie screening crowd-sourcing app. Account details screen 6060 can include name (or preferred name) 6060-1, email 6050-2 and link or buttons 6060-3 through 6060-7 for viewing the user's bookings, screenings, details, stored payment methods, and communication preferences, respectively. In some examples, name (or preferred name) 6060-1 and email 6050-2 can be hidden or partially hidden with X's or x's characters as illustrated in user interface 6060.

User interface 6062 of FIG. 6Q illustrates a "My Bookings" screen displaying the users confirmed bookings 6062-1. The confirmed bookings 6062-1 can include the movie title, the year the movie was released, the cinema theater of the screening, and the date and time of the screening. In some examples, confirmed bookings 6062-1 can also include links (not shown) to the tickets for admissions to each screening listed. User interface 6062 can be displayed in response to the user selecting link or button 6060-3 of user interface 6060 from FIG. 6P. User interface 6064 illustrates a "My Screenings" screen displaying yet to be confirmed screenings (and/or screenings created by the user) 6064-1. User interface 6064 can include the number of users that joined the screening 6064-2 and the number of users required to join to confirm the screening 6064-3. User interface 6064 can be displayed in response to the user selecting link or button 6060-4 of user interface 6060 from FIG. 6P. User interface 6066 illustrates a "My Details" screen for displaying the users name 6066-1, the user's preferred name 6066-2, and/or the user's email address 6066-3. In some examples, details 6066-1 through 6066-3 are editable by the user at user interface 6066. User interface 6066 can be displayed in response to the user selecting link or button 6060-5 of user interface 6060 from FIG. 6P.

User interface 6068 of FIG. 6R illustrates a "Payment Method" screen displaying the user's stored payment methods for bookings. For example, Payment Method screen 6068 can display credit cards (and/or debit cards) 6068-1, third party payment platforms 6068-2 (e.g., Alipay, Venmo, PayPal, Apple Pay), and a link or button 6068-3 for adding additional payment methods. User interface 6068 can be displayed in response to the user selecting link or button 6060-6 of user interface 6060 from FIG. 6P. User interface 6070 of FIG. 6R illustrates a "Communication Preference" screen displaying the user's communications preferences. For example, Communication Preference screen 6070 can include the user's preferred email address 6070-1, phone number 6070-2 for text messages and/or phone calls, and linked text messaging and/social media accounts 6070-3 (e.g., Wechat, WhatsApp, Facebook Messenger). User interface 6070 can also include a link 6070-4 to edit the user's communication preferences. User interface 6070 can be displayed in response to the user selecting link or button 6060-7 of user interface 6060 from FIG. 6P.

Thus, the examples of the disclosure provide various ways to crowd-source movie screenings at cinema theaters.

Therefore, according to the above, some examples of the disclosure are directed to a method for crowd-souring a screening by a first user of a first electronic device comprising: displaying, at a first display of the first electronic device, a plurality of available content selections received from a first server; receiving, at the first electronic device, a content selection of the plurality of available content selections; in response to receiving the content selection, displaying, at the first display, a plurality of available cinema theater selections received from a second server; receiving, at the first electronic device, a cinema theater selection of the plurality of available cinema theater selections; in response to receiving the cinema theater selection, displaying, at the first display, a plurality of available date and time selections received from the second server; and receiving, at the first electronic device, a date and time selection of the plurality of available date and time selections. Additionally or alternatively to one or more of the examples disclosed above, in some examples, determining, at the first server, whether the screening is expired; in accordance with a determination that the screening is expired, cancelling the screening; in accordance with a determination that the screening is not expired: allowing users to join the screening; in response to a second user joining the screening, determining whether a minimum audience was met; in accordance with a determination that the minimum audience was met, confirming the screening; and in accordance with a determination that the minimum audience was met, continue allowing users to join the screening. Additionally or alternatively to one or more of the examples disclosed above, in some examples, the screening is expired when a current date is passed an expiration date. Additionally or alternatively to one or more of the examples disclosed above, in some examples, allowing users to join the screening comprises: displaying, at a second display of a second electronic device, a plurality of available screenings including the screening received from the first server; receiving, at the second electronic device, a screening selection of the plurality of available screenings, wherein the screening selection is the screening. Additionally or alternatively to one or more of the examples disclosed above, in some examples, the plurality of available screenings are public screenings. Additionally or alternatively to one or more of the examples disclosed above, in some examples, the plurality of available screenings are private screenings; and the second electronic device has access to view the private screenings. Additionally or alternatively to one or more of the examples disclosed above, in some examples, confirming the screening comprises: reserving a cinema theater corresponding to the cinema theater selection at a date and time corresponding to the date and time selection; sending, from the first server to the first and second electronic devices, tickets for admission to the screening to the first and second users. Additionally or alternatively to one or more of the examples disclosed above, in some examples, the minimum audience is defined by a cinema theater corresponding cinema theater selection. Additionally or alternatively to one or more of the examples disclosed above, in some examples, the plurality of available content selections received from the first server are content selections available for screenings within a first threshold distance from a location. Additionally or alternatively to one or more of the examples disclosed above, in some examples, the location is a first location of the first electronic device. Additionally or alternatively to one or more of the examples disclosed above, in some examples, the location is one of an address, a city, a zip code entered at the first electronic device. Additionally or alternatively to one or more of the examples disclosed above, in some examples, the first threshold distance is entered, at the first electronic device, by the first user. Additionally or alternatively to one or more of the examples disclosed above, in some examples, the plurality of available cinema theater selections received from the second server are cinema theaters within the first threshold distance from the location and that have access to content corresponding to the content selection. Additionally or alternatively to one or more of the examples disclosed above, in some examples, the plurality of available date and time selections received from the second server are dates and times the cinema theater selection is available for screenings. Additionally or alternatively to one or more of the examples disclosed above, in some examples, receiving, at the first electronic device, an indication that the screening is a public screening or a private screening. Additionally or alternatively to one or more of the examples disclosed above, in some examples, the first server is the same as the second server. Additionally or alternatively to one or more of the examples disclosed above, in some examples, the first electronic device is a handheld device with a touchscreen. Additionally or alternatively to one or more of the examples disclosed above, in some examples, content corresponding to the content selection comprises a movie.

Some examples of the disclosure are directed to a first electronic device, comprising: one or more processors; memory; a display; and instructions, wherein the instructions are stored in the memory and configured to be executed by the one or more processors, comprising: displaying, at the display, a plurality of available content selections received from a first server; receiving a content selection of the plurality of available content selections; in response to receiving the content selection, displaying, at the display, a plurality of available cinema theater selections received from a second server; receiving a cinema theater selection of the plurality of available cinema theater selections; in response to receiving the cinema theater selection, displaying, at the display, a plurality of available date and time selections received from the second server; and receiving a date and time selection of the plurality of available date and time selections.

Some examples of the disclosure are directed to a non-transitory computer-readable medium of a first electronic device, the storage medium including instructions, which when executed by a processor of the first electronic device, cause the processor to perform a method comprising: displaying, at a first display of the first electronic device, a plurality of available content selections received from a first server; receiving a content selection of the plurality of available content selections; in response to receiving the content selection, displaying, at the first display, a plurality of available cinema theater selections received from a second server; receiving a cinema theater selection of the plurality of available cinema theater selections; in response to receiving the cinema theater selection, displaying, at the first display, a plurality of available date and time selections received from the second server; and receiving a date and time selection of the plurality of available date and time selections.

Although examples have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A method for crowd souring creating a screening by a first user of a first electronic device comprising the steps of:
   displaying, at a first display of the first electronic device, a plurality of available content selections received from a first server;
   receiving, at the first electronic device, a content selection from the plurality of available content selections;
   displaying, at the first display, a plurality of available cinema theater selections received from a second server;

receiving, at the first electronic device, a cinema theater selection of the plurality of available cinema theater selections;

displaying, at the first display, a plurality of available date and time selections received from the second server;

receiving, at the first electronic device, a date and time selection of the plurality of available date and time selections;

receiving, at the first electronic device, an indication that the screening is a private screening or public screening, wherein a private screening can be joined by other users only by invitation from the first user;

determining, at the first server, whether the screening is expired, wherein the screening is expired when a current date is passed an expiration date; and in accordance with a determination that the screening is expired:
  cancelling the screening,
  determine whether another user has scheduled the content selection at one of the plurality of available cinema theater selections, and
  in response to identifying a scheduling of the content selection at one of the plurality of available cinema theater selections by another user, notify the first user of the screening created by said other user; and in accordance with a determination that the screening is not expired:
  allowing other users to join the screening,
  in response to a second user joining the screening, determining whether a minimum audience was met, and
  in accordance with a determination that the minimum audience was met, confirming the screening.

2. The method of claim 1, wherein allowing users to join the screening comprises:
displaying, at a second display of a second electronic device, a plurality of available screenings including the screening received from the first server;
receiving, at the second electronic device, a screening selection of the plurality of available screenings, wherein the screening selection is the screening.

3. The method of claim 2, wherein the plurality of available screenings are public screenings.

4. The method of claim 2, wherein:
the plurality of available screenings are private screenings; and
the second electronic device has access to view the private screenings.

5. The method of claim 1, wherein confirming the screening comprises:
reserving a cinema theater corresponding to the cinema theater selection at a date and time corresponding to the date and time selection;
sending, from the first server to the first and second electronic devices, tickets for admission to the screening to the first and second users.

6. The method of claim 1, wherein the minimum audience is defined by a cinema theater corresponding cinema theater selection.

7. The method of claim 1, wherein the plurality of available content selections received from the first server are content selections available for screenings within a first threshold distance from a location.

8. The method of claim 7, wherein the location is a first location of the first electronic device.

9. The method of claim 7, wherein the location is one of an address, a city, a zip code entered at the first electronic device.

10. The method of claim 7, wherein the first threshold distance is entered, at the first electronic device, by the first user.

11. The method of claim 7, wherein the plurality of available cinema theater selections received from the second server are cinema theaters within the first threshold distance from the location and that have access to content corresponding to the content selection.

12. The method of claim 1, wherein the plurality of available date and time selections received from the second server are dates and times the cinema theater selection is available for screenings that do not conflict with existing scheduled screenings of the cinema theater.

13. The method of claim 1, wherein the first server is the same as the second server.

14. The method of claim 1, wherein the first electronic device is a handheld device with a touchscreen.

15. The method of claim 1, wherein content corresponding to the content selection comprises a movie.

16. A first electronic device, comprising:
one or more processors;
memory;
a display; and
instructions, wherein the instructions are stored in the memory and configured to be executed by the one or more processors, comprising:
  displaying, at the display, a plurality of available content selections received from a first server;
  receiving a content selection from the plurality of available content selections;
  displaying, at the display, a plurality of available cinema theater selections received from a second server;
  receiving a cinema theater selection of the plurality of available cinema theater selections;
  displaying, at the display, a plurality of available date and time selections received from the second server;
  receiving a date and time selection of the plurality of available date and time selections;
  receiving, at the first electronic device, an indication that the screening is a private screening or public screening, wherein a private screening can be joined by other users only by invitation from the first user;
  determining, at the first server, whether the screening is expired, wherein the screening is expired when a current date is passed an expiration date; and
  in accordance with a determination that the screening is expired:
    cancelling the screening,
    determine whether another user has scheduled the content selection at one of the plurality of available cinema theater selections, and
    in response to identifying a scheduling of the content selection at one of the plurality of available cinema theater selections by another user, notify the first user of the screening created by said other user; and
  in accordance with a determination that the screening is not expired:
    allowing other users to join the screening,
    in response to a second user joining the screening, determining whether a minimum audience was met, and
      in accordance with a determination that the minimum audience was met, confirming the screening.

17. A non-transitory computer-readable medium of a first electronic device, the storage medium including instructions, which when executed by a processor of the first electronic device, cause the processor to perform a method comprising the steps of:
- displaying, at a first display of the first electronic device, a plurality of available content selections received from a first server;
- receiving a content selection from the plurality of available content selections;
- displaying, at the first display, a plurality of available cinema theater selections received from a second server;
- receiving a cinema theater selection of the plurality of available cinema theater selections;
- displaying, at the first display, a plurality of available date and time selections received from the second server;
- receiving a date and time selection of the plurality of available date and time selections;
- receiving, at the first electronic device, an indication that the screening is a private screening or public screening, wherein a private screening can be joined by other users only by invitation from the first user;
- determining, at the first server, whether the screening is expired, wherein the screening is expired when a current date is passed an expiration date; and
- in accordance with a determination that the screening is expired:
  - cancelling the screening,
  - determine whether another user has scheduled the content selection at one of the plurality of available cinema theater selections, and
  - in response to identifying a scheduling of the content selection at one of the plurality of available cinema theater selections by another user, notify the first user of the screening created by said other user; and
- in accordance with a determination that the screening is not expired:
  - allowing other users to join the screening,
  - in response to a second user joining the screening, determining whether a minimum audience was met, and
  - in accordance with a determination that the minimum audience was met, confirming the screening.

* * * * *